US012777326B2

(12) United States Patent
Mildh

(10) Patent No.: US 12,777,326 B2
(45) Date of Patent: Oct. 27, 2026

(54) INTERNET PROTOCOL ADDRESS ALLOCATION FOR INTEGRATED ACCESS BACKHAUL NODES

(71) Applicant: TELEFONAKTIEBOLAGET LM ERICSSON (PUBL), Stockholm (SE)

(72) Inventor: Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 638 days.

(21) Appl. No.: 17/637,395

(22) PCT Filed: Jun. 22, 2020

(86) PCT No.: PCT/IB2020/055867

§ 371 (c)(1),
(2) Date: Feb. 22, 2022

(87) PCT Pub. No.: WO2021/033036

PCT Pub. Date: Feb. 25, 2021

(65) Prior Publication Data

US 2022/0286841 A1 Sep. 8, 2022

Related U.S. Application Data

(60) Provisional application No. 62/890,577, filed on Aug. 22, 2019.

(51) Int. Cl.
*H04W 8/26* (2009.01)
*H04L 61/5014* (2022.01)
(Continued)

(52) U.S. Cl.
CPC ........... *H04W 8/26* (2013.01); *H04L 61/5014* (2022.05); *H04W 88/08* (2013.01); *H04W 92/24* (2013.01)

(58) Field of Classification Search
CPC ..... H04W 8/26; H04W 88/08; H04W 88/085; H04W 92/24; H04L 61/5007; H04L 61/5014
See application file for complete search history.

(56) References Cited

U.S. PATENT DOCUMENTS

2005/0282575 A1* 12/2005 Dorenbosch ...... H04W 36/0066 455/550.1
2008/0002672 A1* 1/2008 Lin ......................... H04L 12/66 709/203

(Continued)

FOREIGN PATENT DOCUMENTS

CN 102484789 A 5/2012
CN 201910365426X * 4/2019
WO 2019139524 A1 7/2019

OTHER PUBLICATIONS

Ericsson: "Response to R3-193956, R3-193979, R3-193980, R3-193985, R3-194332 and R3-193563: IAB IP address assignment". 3GPP TSG-RAN WG3 Meeting #105. R3-194527. Ljubljana, Slovenia, Aug. 26-30, 2019.

(Continued)

*Primary Examiner* — Jenee Holland
(74) *Attorney, Agent, or Firm* — FBT Gibbons LLP

(57) ABSTRACT

Methods, donor DU nodes and donor CU nodes, and computer programs are provided for allocating internet protocol, IP, addresses. A request is received at a donor DU node to allocate an IP address for a wireless node. The IP address is allocated for the wireless node by the donor DU node and the IP address is transmitted towards the wireless node. The donor CU node receives a message from a wireless node requesting an IP address. Responsive to receiving the message from the wireless node requesting an IP address, the (Continued)

donor CU node transmits an allocation message to a donor DU node to request IP address allocation for the wireless node.

8 Claims, 18 Drawing Sheets

(51) Int. Cl.
*H04W 88/08* (2009.01)
*H04W 92/24* (2009.01)

(56) References Cited

U.S. PATENT DOCUMENTS

| | | | | |
|---|---|---|---|---|
| 2017/0006499 | A1 | 1/2017 | Hampel et al. | |
| 2019/0053317 | A1* | 2/2019 | Hampel | H04W 76/27 |
| 2019/0075023 | A1* | 3/2019 | Sirotkin | H04W 88/08 |
| 2019/0159277 | A1* | 5/2019 | Zhu | H04L 45/16 |
| 2019/0254090 | A1* | 8/2019 | Yang | H04W 76/22 |
| 2019/0363810 | A1* | 11/2019 | Luo | H04B 17/345 |
| 2019/0394826 | A1* | 12/2019 | Wang | H04W 76/19 |
| 2020/0084688 | A1* | 3/2020 | Mildh | H04W 40/22 |
| 2020/0100124 | A1* | 3/2020 | Hampel | H04W 24/02 |
| 2020/0120725 | A1* | 4/2020 | Mildh | H04W 76/12 |
| 2020/0267508 | A1* | 8/2020 | Fischer | G01S 5/0205 |
| 2020/0337048 | A1* | 10/2020 | Abedini | H04L 1/0009 |
| 2020/0337057 | A1* | 10/2020 | Abedini | H04B 7/0697 |
| 2020/0344843 | A1* | 10/2020 | Zhu | H04W 40/22 |
| 2020/0351854 | A1* | 11/2020 | Wang | H04W 76/12 |
| 2020/0383164 | A1* | 12/2020 | Kim | H04W 76/12 |
| 2021/0051512 | A1* | 2/2021 | Hampel | H04W 80/06 |
| 2021/0126991 | A1* | 4/2021 | Huang | H04L 69/22 |
| 2021/0377930 | A1* | 12/2021 | Liu | H04W 40/02 |
| 2021/0378035 | A1* | 12/2021 | Zhu | H04W 36/0019 |
| 2022/0166703 | A1* | 5/2022 | Xu | H04L 61/50 |
| 2022/0279552 | A1* | 9/2022 | Teyeb | H04W 40/22 |

OTHER PUBLICATIONS

Huawei: "IP address management for IAB nodes". 3GPP TSG-RAN WG3 meeting #107bis-e. R3-202087 (revision of R3-200755). E-meeting, Apr. 20-30, 2020.
Qualcomm Incorporated (Rapporteur): "IAB IP address configuration". 3GPP TSG-RAN WG3 Meeting #103bis. R3-191317. XI'an, China. Apr. 8-12.
Ericsson: "IP Address Assignment for IAB Nodes". 3GPP TSG-RAN WG3 Meeting #103. R3-190352. Athens, Greece. Feb. 25-Mar. 1, 2019.
Ericsson, (TP for NR-IAB BL CR for TS 38.401): IAB-node Integration Procedure, R3-192420, 3GPP TSG-RAN WG3 Meeting #104, Reno, NV, USA, May 13-17, 2019.
Ericsson, (TP for NR-IAB BL CR for TS 38.401): IP Address Management for IAB-nodes, 3GPP TSG-RAN WG3 Meeting #105, R3-193739, Ljubljana, Slovenia, Aug. 26-30, 2019.
Ericsson, IP Address Assignment for IAB Nodes, R2-1901383, 3GPP TSG-RAN WG2 #105, Athens, Greece, Feb. 25-Mar. 1, 2019.
Huawei, R3-194332, 3GPP TSG-RAN WG3 Meeting #105, Ljubljana, Slovenia, Aug. 26-30, 2019.
Nokia, et al., Analysis on IP address management, R3-193956, 3GPP TSG-WG3 Meeting #105, Ljubljana, Slovenia, Aug. 26-30, 2019.
Qualcomm Incorporated, Iab parent-node change, R3-193563, 3GPP TSG-RAN WG3 Meeting #105, Ljublijana, Slovenia, Aug. 26-30, 2019.
RAN3, [Draft] LS on IP assignment in IAB network, R3-193980, 3GPP TSG-RAN WG3 Meeting #105, Ljubljana, SI, Aug. 26-30, 2019.
Samsung, Further discussion on IP address issues of IAB network, R3-193979, 3GPP TSG-RAN WG3 Meeting #105, Ljubljana, SI, Aug. 26-30, 2019.
Samsung, Further discussion on IP address issues of IAB network, R3-194994, 3GPP TSG-RAN WG3 Meeting #105bis, Chongqing, China, Oct. 14-48, 2019.
Samsung, IP address management during the IAB migration, R3-193985, 3GPP TSG-RAN WG3 Meeting #105, Ljubljana, SI, Aug. 26-30, 2019.
Qualcomm Incorporated, "IAB: Signalling protocol for BAP configuration", R2-1909644, 3GPP TSG-RAN WG2 Meeting #107, Prague, Czech Republic, Aug. 26-30.

* cited by examiner

INTERNET PROTOCOL ADDRESS ALLOCATION FOR INTEGRATED ACCESS BACKHAUL NODES

This application is a 371 of International Application No. PCT/IB2020/055867, filed Jun. 22, 2020, which claims the benefit of U.S. Provisional Application No. 62/890,577, filed Aug. 22, 2019, the disclosures of which are fully incorporated herein by reference.

TECHNICAL FIELD

The present disclosure relates generally to communications, and more particularly to communication methods and related devices and nodes supporting wireless communications.

BACKGROUND

The 3GPP RAN working groups (including RAN3) are involved in standardizing support for Integrated Access and Backhaul (IAB) in 3GPP Rel-16. IAB is a way for cellular radio base stations (called IAB nodes) to enable new radio (NR) and/or LTE services to end users wireless devices (UEs) to be wirelessly backhauled using a 5G NR radio link to a Donor radio base station (e.g. Donor gNB-DU (distributed unit) or Donor gNB-CU (central unit) or Donor gNB).

It has been agreed that IAB nodes should consist of two parts. The first part is the IAB mobile termination (MT) which terminates the wireless backhaul link to a parent node and the second part is one or more IAB DU which terminates the radio interfaces to the UEs. The IAB DU is similar to 3GPP-defined gNB-DUs or DUs which perform the parts of the gNB functionality i.e. the lower layers PHY/MAC/RLC of the radio interface towards UEs. The IAB DU provides services to both regular UEs and other IAB nodes. IAB MT supports a subset of UE functionalities and some additional IAB-specific functionalities.

It has also been agreed that the IAB nodes should support the full F1 interfaces towards a Donor gNB-CU or CU which terminates the higher part of the gNB i.e. the radio resource control/packet data convergence protocol (RRC/PDCP) protocols. In order to support the F1 interface, the IAB node DU functionality needs to support IP functionality.

There are a number of proposals that the allocation of the IP address to the IAB nodes is triggered and done by the CU. In these proposals, RRC signaling from CU to IAB node is used to send the allocated IP address. Additionally, in some proposals, the IP address is allocated from a pool of IP addresses available at the CU.

There are some problems with these proposed solutions in the allocation of the IP address to the IAB nodes that is triggered and done by the CU.

SUMMARY

One of the problems is that currently 3GPP DUs can support any number of IP addresses (e.g., multiple IP addresses for OAM, F1-C, F1-U, etc. It is beneficial if a similar principle should also apply for IAB nodes DUs since this allows IAB nodes to split their signaling and data over multiple IP address and network interface cards. No solution has been provided how the CU would be able to know how many IP addresses should be allocated to the IAB node. The prior art solutions seem to assume that the IAB node should only have one IP address.

Another problem is the lack of CUs knowledge about transport network topologies. Contrary to what has been stated, the CU may not be in a good place to allocate IP addresses to IAB nodes. This is because the CU could be located in a central cloud environment and lack the knowledge about which IP addresses should be used in a distributed part of the network. Currently it is not the responsibility of the CU to know the transport network topology, including the corresponding IP subnets and network prefixes. Introducing such functionality could have a big impact on the operation of CUs, which could increase the cost of network management for the operator.

The existing mechanisms used to allocate IP addresses to the CU itself such as DHCP, cloud orchestration etc cannot easily be extended to allocate IP addresses to distributed DUs or IAB nodes located somewhere else in the IP network since it would require knowledge about the transport network topology which is currently most likely not available.

For existing CU-DU splits, the CU does not have the functionality to allocate IP address to the DUs or to know anything about the transport topology.

One of the arguments used to motivate the proposed prior art solution using CU allocation of IP addresses is that CU based allocation of IP address is more efficient than DHCP or OAM based method in case an IAB node is moved from one parent node to another. The argument is based on the claim that the CU could allocate the new IP address quickly at IAB node mobility and then send this allocation to the IAB node in an RRC message e.g. prior to the actual move. In this way the IAB node is ready to communicate with the CU directly after the node.

Unfortunately, no solution is provided for how to perform IP address allocation in an equally efficient way as using CU based allocation, but without the associated drawbacks of CU based allocation.

According to some embodiments of inventive concepts, a method in a donor distributed unit (DU) node for allocating internet protocol (IP) addressed is provided. The method includes receiving a request to allocate an IP address for a wireless node. The method further includes allocating the IP address for the wireless node. The method further includes transmitting the IP address towards the wireless node.

Donor DU nodes, computer programs, and computer program products are also provided that perform analogous operations.

An advantage that is provided is that since the Donor DU node will have means to allocate IP addresses which are routable to the Donor DU node which is difficult or not possible for the Donor CU node to do. In some embodiments, another advantage that can be obtained by allocating the IP address(es) in the Donor DU node is that the Donor DU node can associate the IP addresses with the BAP (backhaul adaptation protocol) identifier which is configured in the Donor DU node for the wireless device. In this way it is not required to separately signal the mapping between IP address(es) to the Donor DU node, which would be the case if the Donor CU node allocated the IP addresses for the wireless node.

In various other embodiments of inventive concepts, a method performed by a donor central unit (CU) node is provided. The method includes receiving a message from a wireless node requesting an IP address. The method further includes responsive to receiving the message from the wireless node requesting an IP address, transmitting an allocation message to the donor DU node to request IP address allocation for the wireless node.

Donor CU nodes, computer programs, and computer program products are also provided that perform analogous operations.

In yet other various embodiments of inventive concepts, a method performed by a wireless node for allocating IP addressed is provided. The method includes transmitting a request to a donor CU node to allocate a plurality of IP addresses for the wireless node. The method further includes receiving a response from the donor CU node which includes the plurality of IP addresses allocated for the wireless node by a donor DU node.

A wireless node is also provided that performs analogous operations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 10:
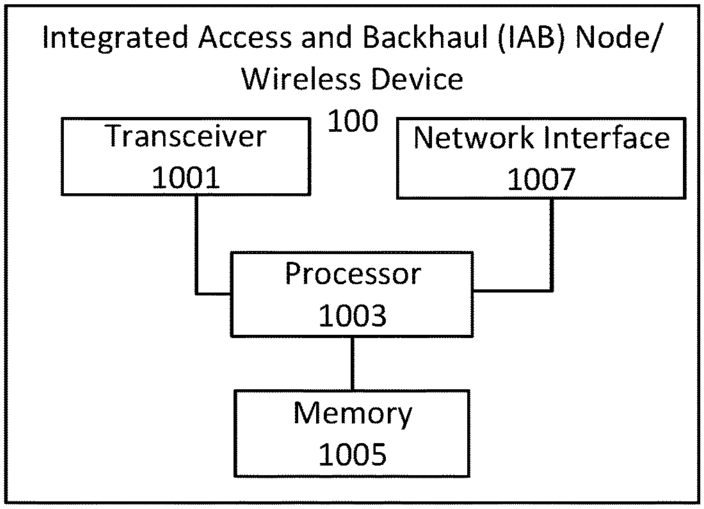
FIG. 10 is a block diagram illustrating an integrated access and backhaul node (e.g., a wireless node) according to some embodiments of inventive concepts.

FIG. 10 depicts an example of an IAB node 100 (also referred to as a wireless node, a wireless user equipment (UE), a base station, eNB, eNodeB, gNB, gNodeB, etc.) of a communication network configured to provide communication according to embodiments of inventive concepts. As shown, IAB node 100 may include a transceiver circuit 1001 (also referred to as a transceiver) including a transmitter and a receiver configured to provide uplink and downlink radio communications with wireless devices and donor CU nodes. The IAB node 100 may include a network interface circuit 1007 (also referred to as a network interface) configured to provide communications with other nodes (e.g., with other IAB nodes, base stations and/or core network nodes) of the wireless communication network. The IAB node 100 may also include a processor circuit 1003 (also referred to as a processor) coupled to the transceiver circuit 1001, and a memory circuit 1005 (also referred to as memory) coupled to the processor circuit 1003. The memory circuit 1005 may include computer readable program code that when executed by the processor circuit 1003 causes the processor circuit to perform operations according to embodiments disclosed herein. According to other embodiments, processor circuit 1003 may be defined to include memory so that a separate memory circuit is not required.

As discussed herein, operations of the IAB node 100 may be performed by processor 1003, network interface 1007, and/or transceiver 1001. For example, processor 1003 may control transceiver 1001 to transmit downlink communications through transceiver 1001 over a radio interface to one or more UEs or base stations and/or to receive uplink communications through transceiver 1001 from one or more UEs or base stations over a radio interface. Similarly, processor 1003 may control network interface 1007 to transmit communications through network interface 1007 to one or more other IAB nodes and/or to receive communications through network interface from one or more other IAB nodes. Moreover, modules may be stored in memory 1005, and these modules may provide instructions so that when instructions of a module are executed by processor 1003, processor 1003 performs respective operations (e.g., operations discussed below with respect to example embodiments). Moreover, IAB nodes discussed herein may be implemented as virtual IAB nodes.

Accordingly, an IAB node 100 according to some embodiments includes a processor circuit 1003, a transceiver 1001 coupled to the processor circuit, and a memory 1005 coupled to the processor circuit, the memory including machine readable program instructions that, when executed by the processor circuit, cause the IAB node 100 to perform operations.

Figure 11:
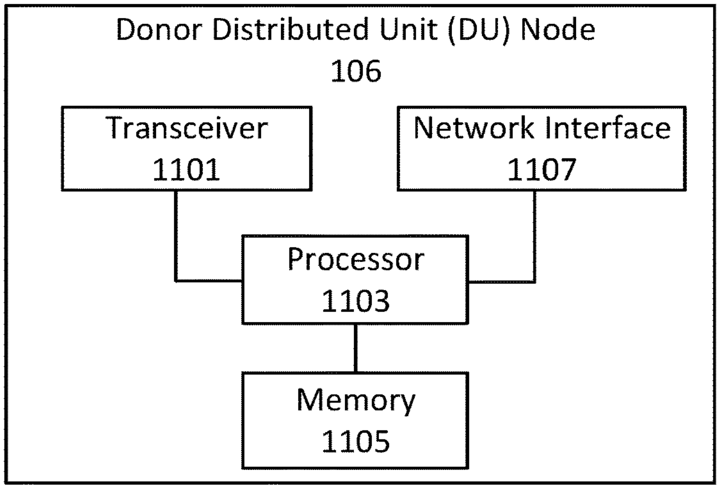
FIG. 11 is a block diagram illustrating a donor distributed unit node according to some embodiments of inventive concepts.

FIG. 11 is a block diagram illustrating elements of a donor distributed unit (DU) node 106 (also referred to as a network node, base station, eNodeB/eNB, gNodeB/gNB, etc.) of a communication network configured to provide cellular communication according to embodiments of inventive concepts. As shown, the donor DU node may include transceiver circuitry 1101 (also referred to as a transceiver) including a transmitter and a receiver configured to provide uplink and downlink radio communications with mobile terminals and donor CU nodes 108. The donor DU node may include network interface circuitry 1107 (also referred to as a network interface) configured to provide communications with other nodes (e.g., with other CU nodes and DU nodes) of the network. The donor DU node may also include processing circuitry 1103 (also referred to as a processor) coupled to the transceiver circuitry, and memory circuitry 1105 (also referred to as memory, e.g., corresponding to device readable medium) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that a separate memory circuitry is not required.

As discussed herein, operations of the donor DU node 106 may be performed by processing circuitry 1103, network interface 1107, and/or transceiver 1101. For example, processing circuitry 1103 may control transceiver 1101 to transmit downlink communications through transceiver 1101 over a radio interface to one or more mobile terminals UEs and/or to receive uplink communications through transceiver 1101 from one or more mobile terminals UEs over a radio interface. Similarly, processing circuitry 1103 may control network interface 1107 to transmit communications through network interface 1107 to one or more other network nodes and/or to receive communications through network interface from one or more other network nodes. Moreover, modules may be stored in memory 1105, and these modules may provide instructions so that when instructions of a module are executed by processing circuitry 1103, processing circuitry 1103 performs respective operations (e.g., operations discussed below with respect to Example Embodiments relating to donor DU nodes).

Figure 12:
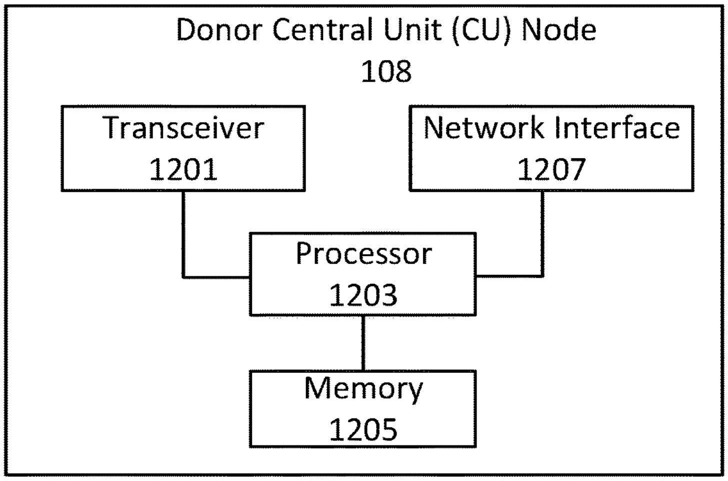
FIG. 12 is a block diagram illustrating a donor central unit node according to some embodiments of inventive concepts.

FIG. 12 is a block diagram illustrating elements of a donor central unit (CU) node 108 (also referred to as a core network node, base station, eNodeB/eNB, gNodeB/gNB, etc.) of a communication network configured to provide cellular communication according to embodiments of inventive concepts. As shown, the donor CU node may include transceiver circuitry 1201 (also referred to as a transceiver) including a transmitter and a receiver configured to provide uplink and downlink radio communications with mobile terminals and donor DU nodes 106. The donor CU node may include network interface circuitry 1207 (also referred to as a network interface) configured to provide communications with other nodes (e.g., with other CU nodes and DU nodes) of the network. The donor CU node may also include processing circuitry 1203 (also referred to as a processor) coupled to the transceiver circuitry, and memory circuitry 1205 (also referred to as memory, e.g., corresponding to device readable medium) coupled to the processing circuitry. The memory circuitry 1205 may include computer readable program code that when executed by the processing circuitry 1203 causes the processing circuitry to perform operations according to embodiments disclosed herein. According to other embodiments, processing circuitry 1203 may be defined to include memory so that a separate memory circuitry is not required.

As discussed herein, operations of the donor CU node 108 may be performed by processing circuitry 1203, network interface 1207, and/or transceiver 1201. For example, processing circuitry 1203 may control transceiver 1201 to transmit downlink communications through transceiver 1201 over a radio interface to one or more mobile terminals UEs and/or to receive uplink communications through transceiver 1201 from one or more mobile terminals UEs over a radio interface. Similarly, processing circuitry 1203 may control network interface 1207 to transmit communications through network interface 1207 to one or more other network nodes and/or to receive communications through network interface from one or more other network nodes. Moreover, modules may be stored in memory 1205, and these modules may provide instructions so that when instructions of a module are executed by processing circuitry 1203, processing circuitry 1203 performs respective operations (e.g., operations discussed below with respect to Example Embodiments relating to donor CU nodes).

The topic of IP address assignment to an IAB node has been discussed in several contributions submitted to the 3GPP RAN3 #105 meeting in Slovenia on the 26-30 Aug. 2019. The contributions are stored at: https://www.3gpp.org/ftp/TSG_RAN/WG3_Iu/TSGR3_105/Docs/. The relevant parts from the RAN3 #105 meeting contributions are presented below.

Contribution R3-194332 to RAN3#105

For the DU part of IAB node, three options for IP address allocation shall be discussed:

Option 1. IP address of the IAB node DU is assigned by the IAB donor DU using dynamic host control protocol (DHCP) (e.g., Donor-DU/DHCP) based solution.

Option 1 requires that the IAB donor DU works as a DHCP proxy or the DHCP server, which will increase the complexity of the IAB donor DU. A key problem is how to enable the DHCP message (e.g. DHCP discover, DHCP offer, DHCP request, DHCP acknowledge (ACK)) to be forwarded between the IAB node and the IAB-donor-DU with suitable quality-of-service (QoS) guarantee. RAN2 should specify how to enable the DHCP message routing and bearer mapping. For example, some specific routing entry and bearer mapping rule needs to be configured and some backhaul (BH) radio link control (RLC) channel to carry the DHCP message is necessary, since the DHCP message may use IP broadcast or new allocated IP address as destination IP address, which is notably different from the normal CP and UP traffic. DHCP also requires the client to provide its hardware address (i.e. MAC address) in the DHCP Discover/Request message. However, the IAB node does not have a MAC address, and this problem may result in some modification to the DHCP message, which is out of the scope of 3GPP.

Observation 2: The donor-DU/DHCP based solution requires that RAN2 specify routing and bearer mapping for DHCP message transmission across wireless BH links.

In addition, the IAB network may change topology and IAB node can connect to a different IAB donor DU after the topology change. Thus, the IAB node should obtain a new IP address from the new IAB donor DU after a topology change. This will result in a long interruption time of the transmitted traffic since the IP update will cause a new transport network layer (TNL) connection procedure, as well as the update of F1 interface. It is very possible that IP address reassignment will cause F1-application protocol (F1-AP) re-establishment (e.g. F1 Reset or F1 Setup procedure), in which all the F1-AP UE-related contexts and signalling connections are released, and any existing application level configuration data may be erased. And then all the descendent IAB nodes and corresponding UEs will be subject to failure.

Observation 3: For donor-DU/DHCP based solution, changing IAB donor DU requires an IP address reassignment, and it will cause F1-AP re-establishment (e.g. F1 Reset or F1 Setup procedure), which may result in the failure of all the IAB nodes and its descendent IAB nodes and accessed UEs.

Furthermore, if the IAB node supports multi-connectivity in the BH link, an IAB node can connect to the IAB Donor CU via two different parent nodes. The two different parent nodes may connect to the IAB Donor CU via more than one IAB donor DU. Therefore it still needs to be clarified which IAB donor DU should be responsible for the IP address allocation for a given IAB node if this IAB node connects to multiple IAB donor DUs, and how to enable the IP address allocated by one the IAB donor DU of being routable via another IAB donor DU.

Observation 4: Donor-DU/DHCP based solution needs additional work to enable IP address to be routable in BH DC scenario.

Option 2. IP address of the IAB node DU is assigned by the IAB Donor CU (Donor-CU based solution).

In this option, the IAB Donor CU can maintain a pool of the IP addresses for all the connected IAB nodes. After the MT part connects to the IAB Donor CU, the IAB Donor CU can allocate a suitable IP address to this IAB node after the IAB Donor CU knows that the connected node is an IAB node rather than a normal UE. The IAB Donor CU can include the assigned IP address in some DL RRC message to the MT part of the IAB node. Obviously, this solution is simpler than option 1. The only RAN2 impact is how to enable the RRC message to carry the allocated IP address to the IAB node. No additional works are necessary, since RRC message transfer is supported between the IAB-MT and the IAB Donor CU, and the DHCP related 4 steps communication can be avoided also.

Observation 5: For CU based solution, the IAB Donor CU can use RRC message to allocate an IP address to the IAB node. This option is simpler and has less RAN2 impacts than the donor-DU/DHCP based solution.

In addition, note that the assigned IP address may relate to the IAB donor DU via which the IAB node connects to the IAB Donor CU. Otherwise, more work with respect to the IP routing configuration between the IAB Donor CU and the IAB donor DU is necessary to enable the routing of traffic towards the IAB node via the IAB donor DU. This problem is similar to the routing problem in BH DC scenario when adopting option 1, i.e. how to enable the routing between the IAB node and the IAB Donor CU through the IAB donor DU, which is not responsible for the IP address allocation of the IAB node. When the IAB node topology changes, IP address reassignment may also be needed, and will also result in the failure of all the IAB nodes and its descendent IAB nodes and corresponding UEs.

Observation 6: CU based solution also needs additional work to enable IP address to be routable via the donor-DU and also has IP address reassignment issue.

This option has another potential advantage, since all the IP related traffic for the IAB node DU (F1-U, F1-C, Operations, Administration and Maintenance (OAM), etc.) can be transmitted via the IAB Donor CU. The IAB Donor CU can be enabled to control load balance among different IAB donor DUs through assigning of IP address which relates to some given IAB donor DU, and the traffic using this IP address will be routed via the given IAB donor DU accordingly.

Option 3. IAB node obtain IP address from the OAM configuration (OAM based solution).

In this option, the IAB node should connect to the OAM before it can obtain an IP address for its DU part. Thus the IAB node needs to support OAM connectivity via establishing a PDU session/PDN connection for its MT part, and download some essential DU related configuration (including the IP address for the DU part of the IAB node) from the OAM. After that, the DU part can connect to the OAM through BH IP routing directly, just like a normal gNB-DU.

This option may require that the OAM be aware of the IAB donor (the IAB Donor CU, and/or the IAB donor DU) via which the IAB node is connected. The OAM may also need information about the IAB donor (at least the IAB Donor CU) when configuring the cell ID/configurations for the IAB node, thus extra work is necessary to enable the notification of the IAB donor DU information to the OAM. Considering that when the IAB node topology changes, IP address reassignment may also be needed if IAB node connect to a new IAB donor DU. This will result in the failure of all the IAB nodes and its descendent IAB nodes and corresponding UEs.

Observation 7: OAM based solution also needs additional work (e.g. providing donor DU information) to enable IP routable via the donor-DU and also has IP address reassignment issue.

Proposal 1: In order to enable IP routable via the donor-DU, all the options have IP address reassignment issue which cause the failure of all the IAB nodes and its descendent IAB nodes and corresponding UEs.

Proposal 2: How to solve IP address reassignment issue should seriously consider the topology update scenario, and potential enhancement for supporting mobile IAB in future.

IAB Donor-CU IP Address Notification

In order to initialize the TNL setup of F1 interface, the IAB-DU needs to know the IP address of the IAB donor-CU. As in the normal CU-DU case, the Donor-CU IP address can be pre-configured in the IAB-DU, which has no impact on standard. Another straightforward way is that the Donor-CU sends its IP address via RRC signalling to the IAB-MT and the IAB-MT forwards the IP address to the IAB-DU. In order to avoid the complexity of pre-configuration, it is better to allow the IAB donor-CU to send its IP address to the IAB-node by signalling. Small amount of RAN2 impacts will be involved.

Proposal 3: The IAB donor-CU sends its IP address to the IAB-node by RRC signalling, with only small RAN2 impacts.

Contribution R3-193979 to RAN3#105

Signaling Procedure for IP Assignment of IAB-DU

Figure 1:
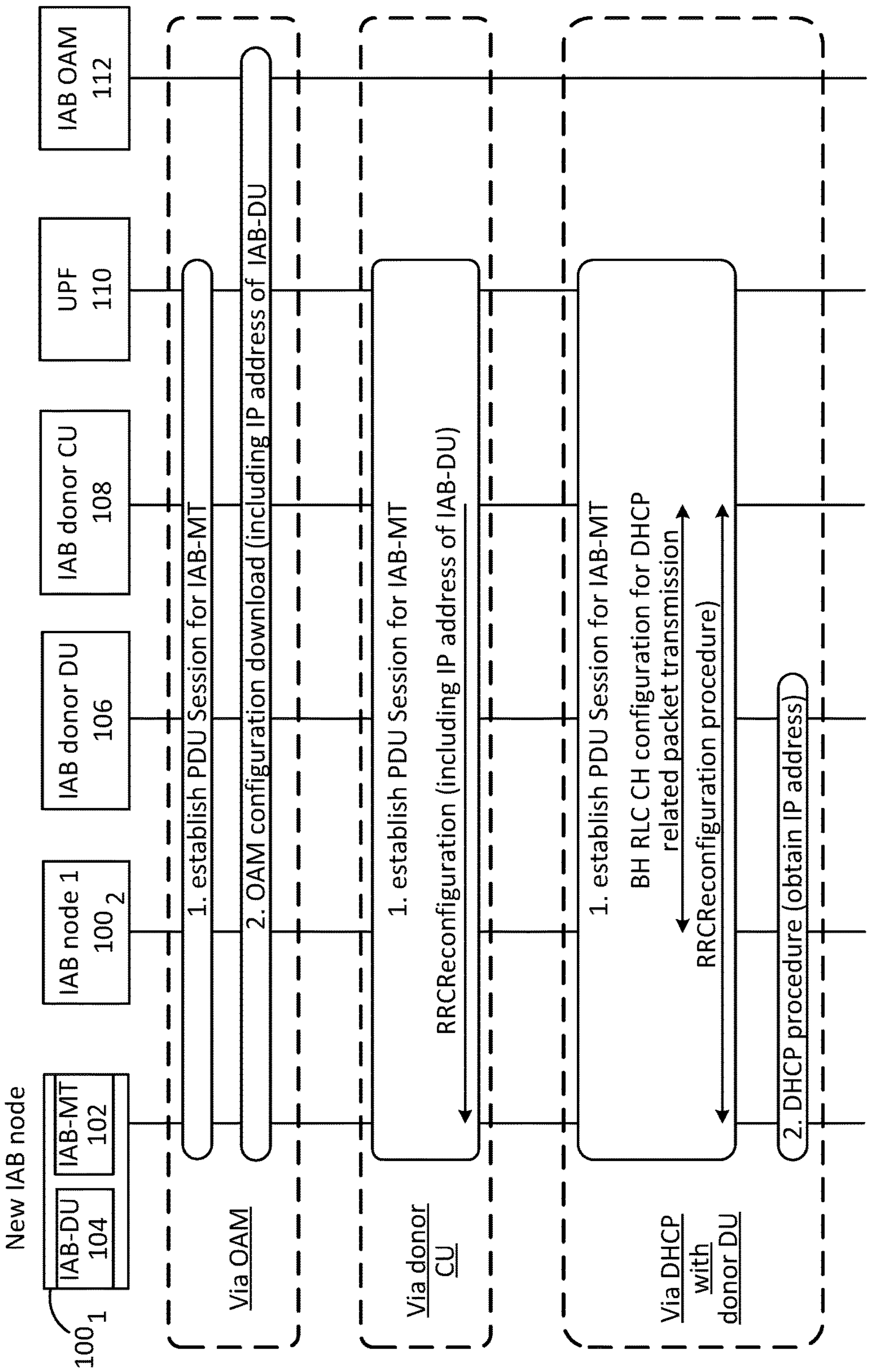
FIG. 1 is a signaling diagram illustrating signaling procedures for different IP address assignments according to various embodiments of inventive concepts.

The current agreement indicates that the IAB-DU IP address can be assigned by OAM, or by Donor CU, or by donor DU. The procedure of each method is different, which is shown in FIG. 1:

IP assignment via OAM

In this method, the IAB-MT part 102 of the new IAB node 100 should establish the PDU session with the OAM. Thus, the procedure is:

- Step 1: IAB-MT establishes PDU session with OAM 114.
- Step 2: the OAM configuration including IP address of IAB-DU 104 is sent to the IAB-MT 102 via the established PDU session.

IP Assignment Via Donor CU

In this method, the IP address is configured via RRC message from IAB Donor CU 108. During the PDU session establishment of IAB-MT 102, the IAB Donor CU 108 is already aware of the new accessing IAB node 100 is an IAB node. Thus, the IP address can be sent via RRCReconfiguration message when establishing PDU session.

IP Assignment Via Donor DU

Figure 2:
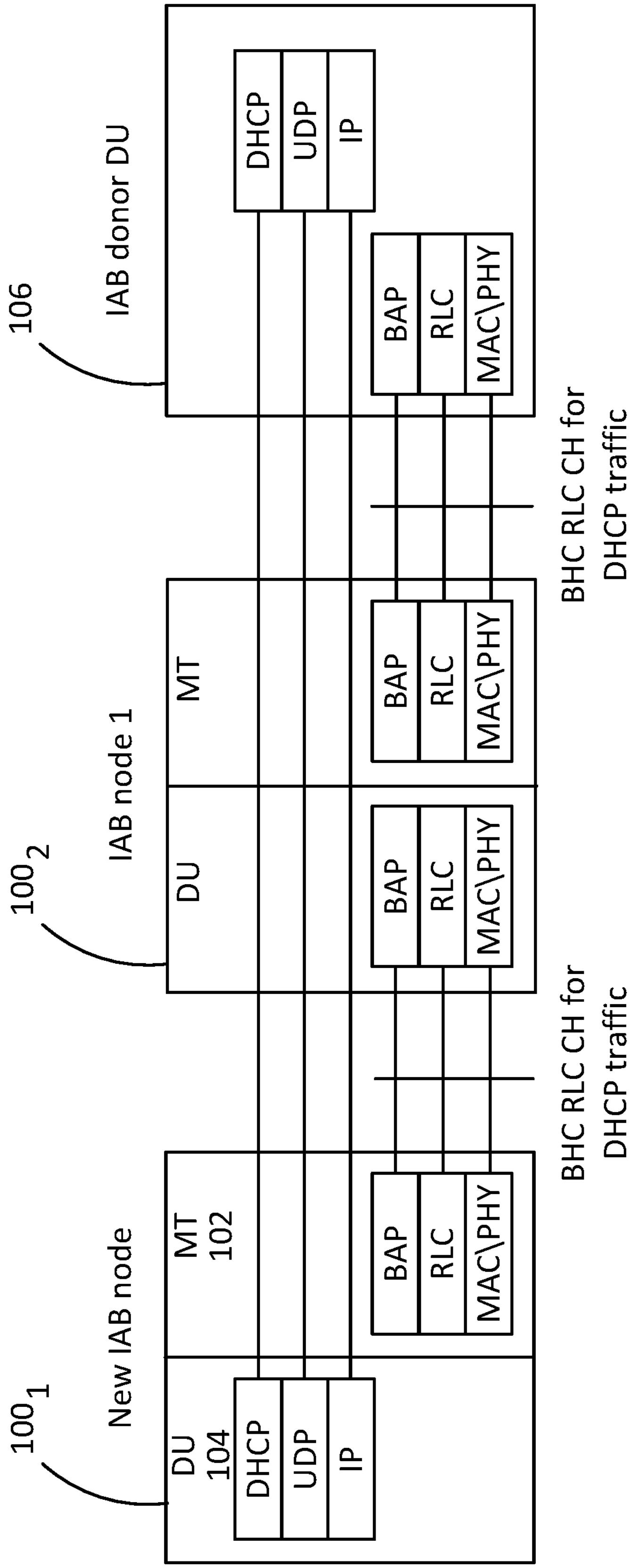
FIG. 2 is a block diagram illustrating a protocol stack for IP assignment via IAB donor DU according to some embodiments of inventive concepts.

In this method, the DHCP server is deployed in IAB donor DU 106, and the DHCP messages for IP address assignment should be exchanged between IAB-DU part 104 of new IAB node 100 and IAB donor DU 106 via the protocol stack as shown in FIG. 2. Moreover, the packets carrying DHCP messages from new IAB node 100 will not be further forwarded to IAB Donor CU 108 (Note that, for normal UE data, the packet should be finally forwarded to IAB Donor CU 108). With above consideration, the BH RLC CH should be configured for DHCP message. Thus, as shown in FIG. 1, the signaling procedure of IP address assignment is as follows:

- Step 1: IAB-MT establishes the PDU session with OAM 114. During this procedure, IAB Donor CU 108 should configure the BH RLC CH for DHCP message transfer.
- Step 2: The DHCP procedure is performed in order to derive the IP address of IAB-DU 106.

Comparison of IP Assignment Schemes

IP Assignment Via OAM

Pros.:

no specification impact

Cons.:

Adapt to topology adaptation: the OAM 114 should assign new IP address to IAB-DU 106 as long as the donor DU is changed. In other words, OAM 114 should be aware of topology adaptation (i.e., IAB donor DU change).

IP Assignment Via Donor CU

Pros:

Simple and fast: IP address can be derived via one RRC message, and it can happen during the initial access procedure of IAB-MT 102. Specifically, the IP address can be derived during the PDU session establishment procedure of IAB-MT 102.

Adapt to topology adaptation: once IAB donor DU 106 is changed, the IAB Donor CU 108 can re-configure new IP address to IAB-DU 104. Such reconfiguration can facilitate the DL GTP-U tunnel update (i.e., update the IP address of DL GTP-U tunnel) of each UE DRB served by the IAB node if the connected donor DU is changed [2].

Cons.:

Specification impact: RRC message needs to include IP address information

IP address pool pre-configuration: the IAB Donor CU 108 should be pre-configured a pool of IP addresses IP Assignment Via Donor DU Pros.:

reuse existing DHCP scheme

Cons.:

Specification impact: a specific BH RLC CH should be set up to transmit DHCP based message.

Deployment complexity: DHCP server should be additionally deployed in the IAB donor DU, and DHCP client should be additionally deployed in each IAB node.

Complexity for topology adaption: once the IAB donor DU is changed, the specific BH RLC CH should be configured, and the DHCP related procedure should be implemented.

Based on the above comparison, IP assignment via Donor DU is more complex than other methods. Thus, the following proposals are made:

Proposal 1: the IP address of IAB-DU can be assigned via Donor CU or via OAM.

After down-selecting IP assignment via IAB donor DU 106, whether two other methods can be coexist or not should be further discussed. According to FIG. 1, "IP assignment via Donor CU" can occur before "IP assignment via OAM". If IAB-DU 106 does not obtain the IP address during the PDU session establishment, the IAB-DU 106 can request IP address from OAM 114; otherwise, IAB-DU 106 needn't request IP address from OAM 114.

Proposal 2: both "IP assignment via OAM" and "IP assignment via Donor CU" can be co-exist in IAB network.

3 IAB Donor CU IP Address Notification

Figure 3:
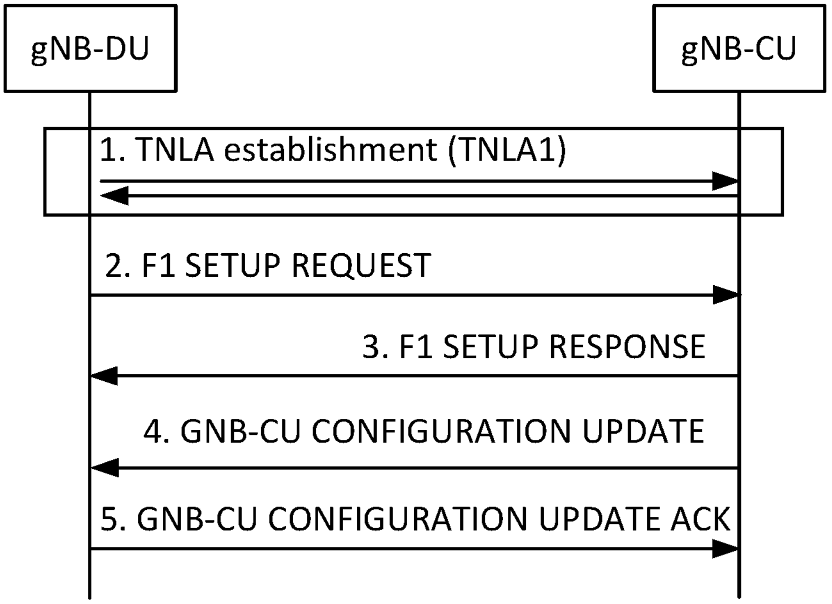
FIG. 3 is a block diagram illustrating a wireless device UE according to some embodiments of inventive concepts.
Figure 8:
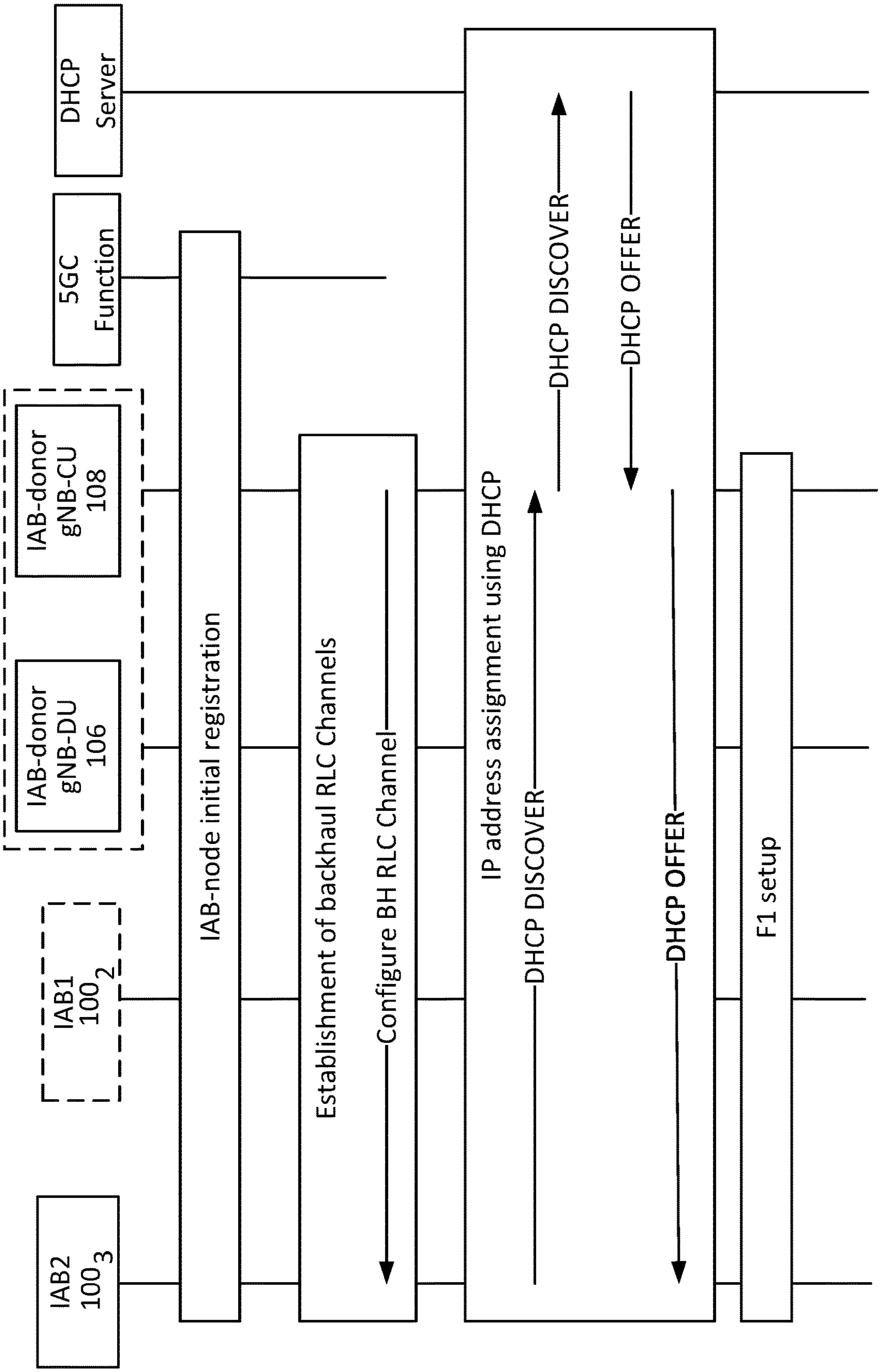
FIG. 8 is a signaling diagram illustrating using DCHP to assign the IAB-DU's IP address according to some embodiments of inventive concepts.

Before establishing F1 interface with IAB Donor CU, the IAB donor DU should derive the IP address of IAB Donor CU. In legacy CU-DU split, the following description can be found in TS38.401:

FIGS. 8.8-1 of TS38.401 is reproduced as FIG. 3.

In operation 1, the gNB-DU establishes the first TNLA with the gNB-CU using a configured TNL address.

NOTE: The gNB-DU may use different source and/or destination IP end point(s) if the TNL establishment towards one IP end point fails. How the gNB-DU gets the remote IP end point(s) and its own IP address are outside the scope of this specification.

The TNLA establishment part of FIG. 3 indicates that the gNB-CU IP address notification to gNB-DU is out of 3GPP scope. In legacy CU-DU split, the potential way is to be configured via OAM, which means that the gNB-CU is selected by the OAM. As indicated by the editor note, in IAB network, the IAB node can derive the IAB Donor CU's IP address based on the OAM configuration. However, the OAM based method may face the following issues:

Unawareness of topology (i.e., the donor DU connected by the IAB node is not known by OAM)

Figure 4:
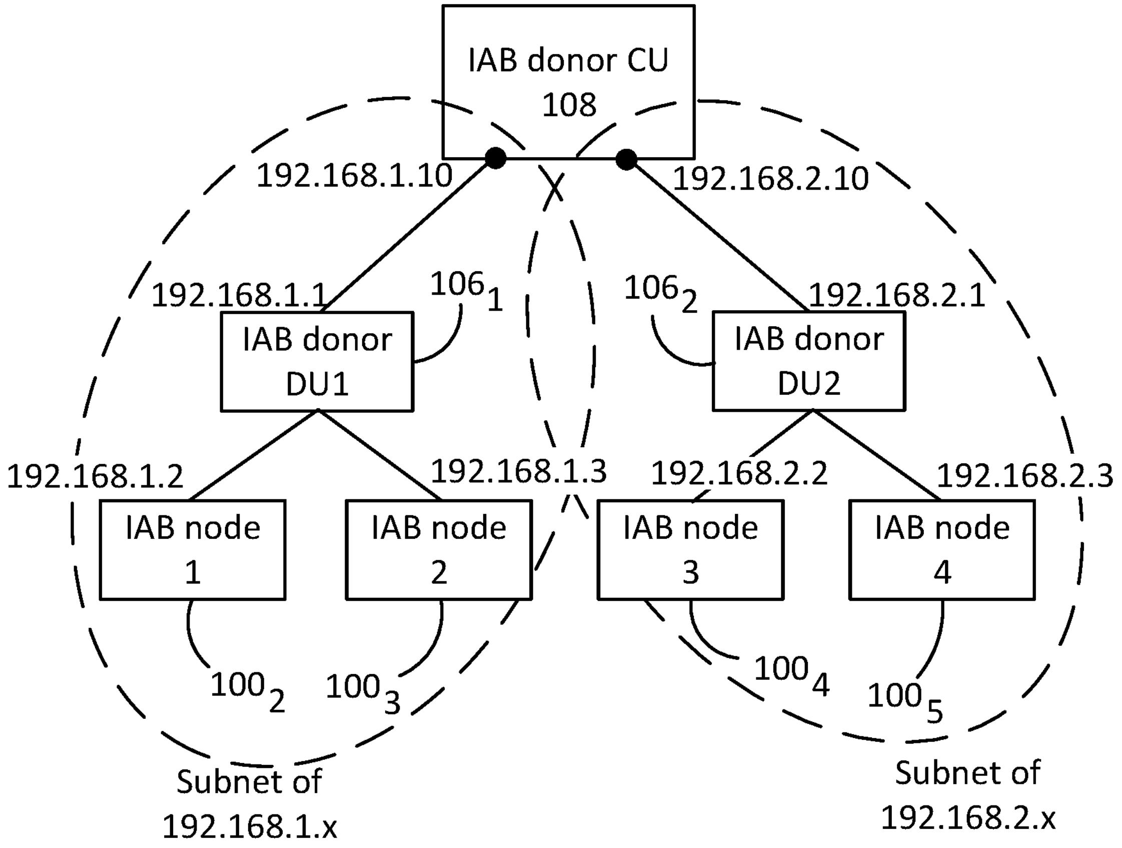
FIG. 4 is a block diagram illustrating different IPs of an IAB Donor CU for different subnets according to some embodiments.

In one possible deployment, the IAB Donor CU 108 may use different IP addresses to communicate with IAB nodes connecting to different IAB donor DUs 108. For example, as shown in FIG. 4, IAB Donor CU 108 uses two different IP addresses (i.e., 192.168.1.10 and 192.168.2.10) to communicate with IAB nodes 100 in two different subnets (i.e., subnet 192.168.1.x, and subnet 192.168.2.x), respectively. This may be because the IAB Donor CU 108 uses two different NICs (network interface cards) to serve different subnets. Moreover, in this deployment, if the IAB Donor CU 108 uses the IP address within the same subnet as the IAB node 100, the packet routing over wired F1 interface may be more efficient. If the IAB node 100 is changed to a different IAB donor DU 106, which results in the subnet change, the OAM 114 cannot know such topology change. Thus, it may allocate a non-suitable IP address of IAB Donor CU 108 (e.g., the IP address is not belonging to the subnet where the IAB-DU's IP address belongs to).

Delay IAB Node Access

Figure 5:
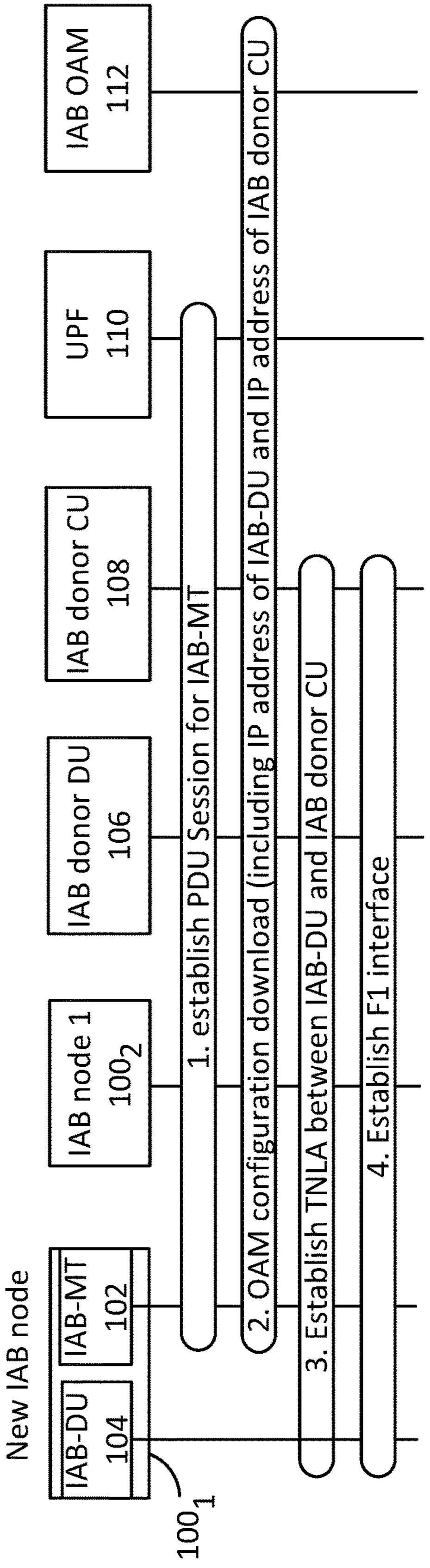
FIG. 5 is a signaling diagram illustrating derivation of IP address of IAB Donor CU via OAM in according to some embodiments of inventive concepts.

The signaling procedure for OAM based method is given in FIG. 5. In FIG. 5, the TNLA association is established after downloading the OAM configuration, and then the F1 interface is established.

Load Imbalance Over IAB Donor CU

Figure 6:
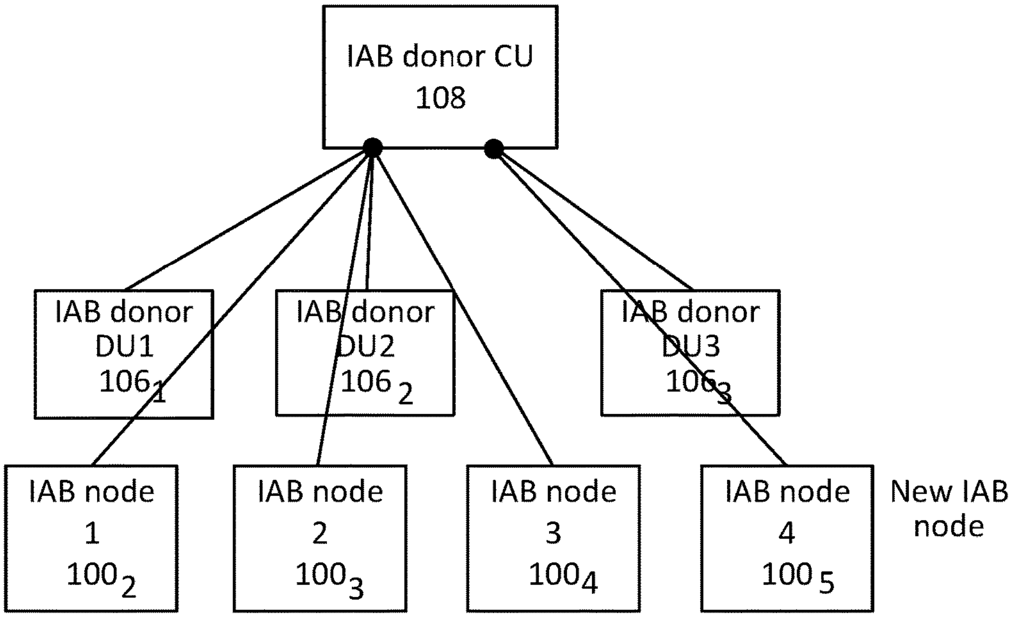
FIG. 6 is a block diagram illustrating IP address selection at an IAB Donor CU according to some embodiments of inventive concepts.

In legacy CU-DU, a gNB-CU may be equipped with multiple NICs. The load served by each NIC is limited. Thus, to distribute the load among different NICs, multiple stram control transmission protocol (SCTP) association is defined over F1 to allow the gNB-CU change of the TNL association endpoint. In IAB network, IAB Donor CU 108 may be deployed with multiple NICs as well. However, OAM 114 does not know the load situation of each NIC on the IAB Donor CU 108. Thus, the OAM 114 may assign an IP address of IAB Donor CU 108 which is associated to the NIC with heavy load. For example, in FIG. 6, IAB Donor CU 108 has two NICs with IP addresses of IP_1 and IP_2, respectively. Five nodes (i.e., IAB donor DU 1/2, IAB node 1/2/3) are connected to IP_1. However, the load of IP_1 is low since the number of UEs is small. On the other hand, one node (i.e., IAB donor DU 3) with heavy load is connected to IP_2. OAM 114 does not know such situation. If a new IAB node 100, e.g., IAB node 4, is accessing, OAM 114 may assign IP_2 to IAB node 4, which results in that the IAB node 4 connects to IAB Donor CU 108 via a heavy-loaded NIC.

Figure 7:
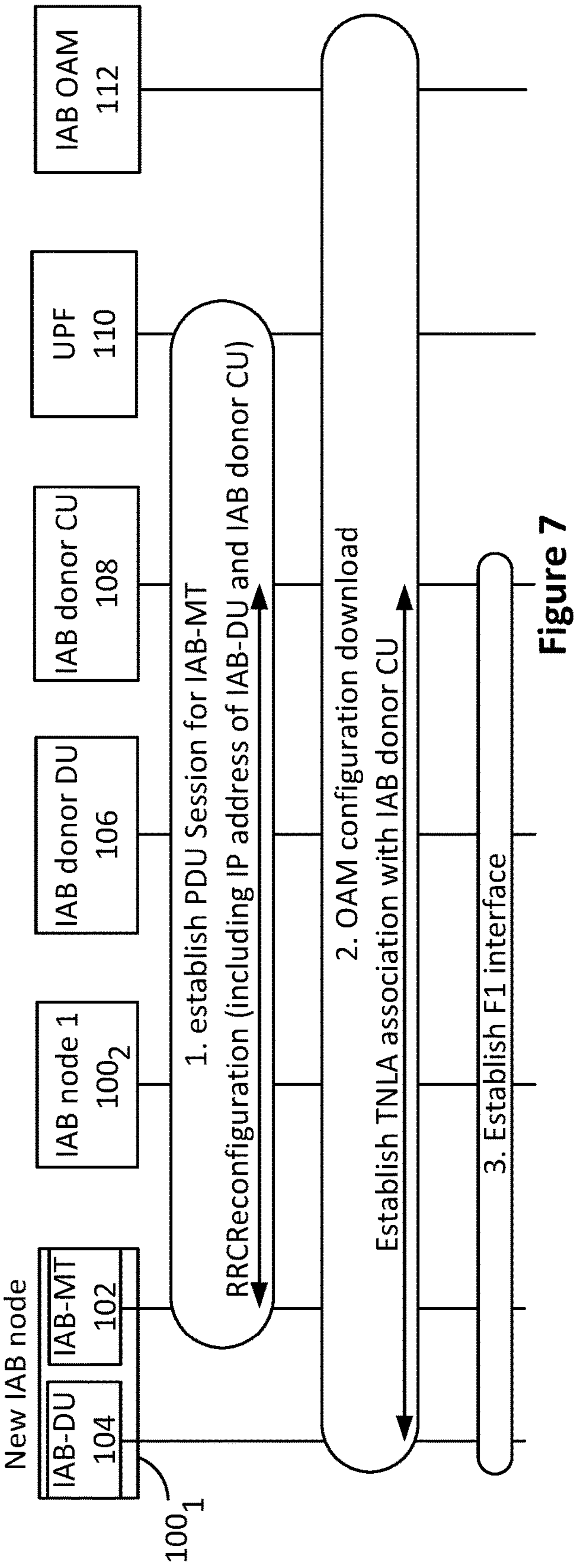
FIG. 7 is a signaling diagram illustrating derivation of IP address of IAB Donor CU via RRC according to some embodiments of inventive concepts.

To alleviate the above issues, allowing the IAB Donor CU to inform the IAB node its IP address provides the below advantages:

- IAB Donor CU 108 knows which IP address is used to communicate with the IAB nodes 100 connecting to a IAB donor DU 106
- IAB Donor CU 108 can inform the IP address to IAB node 100 during the OAM configuration downloading, and the SCTP association between IAB Donor CU 108 and IAB node 100 can be established before OAM configuration downloading. Thus, the IAB node 100 accessing, especially the IAB node migration procedure, can be sped up. As shown in FIG. 7, if the IP address of IAB Donor CU 108 is informed by the IAB Donor CU 108, IP addresses for both IAB-DU 106 and IAB Donor CU 108 can be derived during the PDU session establishment procedure of IAB-MT 102. After that, the TNLA association can be established in parallel with OAM configuration downloading. Thus, this can speed up the F1 interface establishment procedure in an IAB network.
- IAB Donor CU 108 can inform IAB node 100 the IP address based on the load distribution among different NICs.

Based upon the above, proposals 3 and 4 have been developed.

Proposal 3: the IP address of the IAB Donor CU can be informed by IAB Donor CU to IAB node.

During IAB node accessing procedure, the MT part 102 connects to the network first. Thus, it is beneficial to inform the IP addresses of IAB Donor CU 108 and IAB-donor DU 106 via RRC message.

Proposal 4: the IP addresses of IAB Donor CU and IAB-DU are sent to IAB node via RRC message.

Contribution R3-193956 to RAN3#105

There were two options discussed in the last RAN3 meeting.

Option 1: using DHCP to assign the IAB-DU's IP address is illustrated in FIG. 8.

In this Option, after the BH RLC Channel is established, the DHCP client in the IAB initiates the DHCP procedure to get an IP address. IAB uses this IP address for F1.

Figure 9:
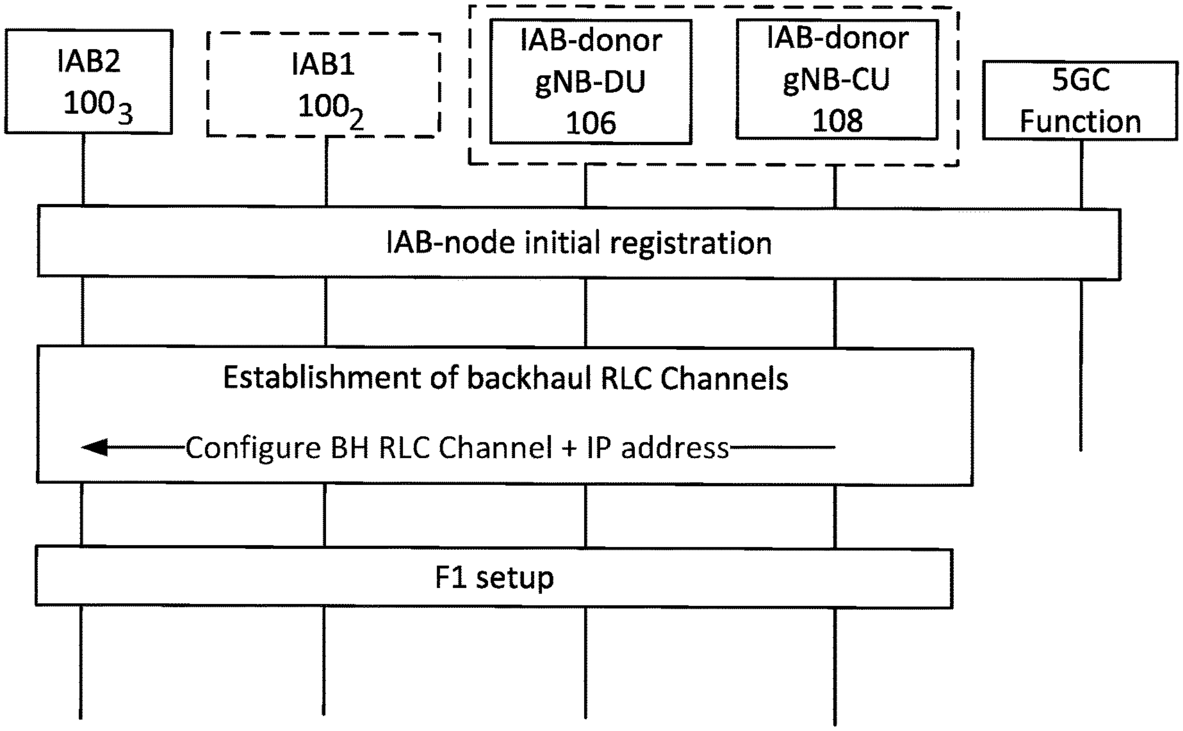
FIG. 9 is a signaling diagram illustrating using RLC to assign the IAB-DU's IP address according to some embodiments of inventive concepts.

Option 2: using RRC to assign the IAB's IP address is illustrated in FIG. 9.

In this Option, during the BH RLC Channel establishment procedure, the Donor-CU assign the IP address to the IAB. IAB uses this IP address for F1.

For Option 1, the details were not discussed in the last meeting. The following issues need to be further discussed:

- How to transfer the UL DHCP packets (e.g. DHCP DISCOVER) over the BH RLC Channel?

For DHCP packets from a normal UE, the DHCP packets are sent as normal U-Plane packet. When the serving DU (i.e. the DU in the intermediate IAB, or Donor) receive a UL U-plane packet, the serving DU encapsulate the UL U-plane packet in F1 GTP-U. But this cannot be used for the IAB, since the F1 GTP-U is terminated at the Donor-CU, while the UL DHCP packet shall be terminated at the Donor-DU (or forward to a separate DHCP server). The Servering DU (e.g. IAB1-DU) need to know whether the received UL packet is a DHCP packet which requires a different handling. This requires either an explicit indication associated with the UL DHCP packet over the air, or need a separate BH RLC channel dedicated for UL DHCP packet.

Processing in Donor-DU

The Donor-DU only terminate the DHCP packets from the IAB, while forward other UL packets. It is unclear how the Donor-DU can know a received UL packet is a DHCP packet or not. Otherwise, the Donor-DU has to check every received UL packet.

DL DHCP packet to IAB

The DHCP message to the client (i.e. IAB in this case) may be sent as unicast or broadcast. Due to the lack of native broadcast in IAB, the Donor-DU have to use unicast to send the DL DHCP packet (e.g. DHCP OFFER) to the IAB. For sending the normal unicast DL packet (e.g. DL F1-C/U), the Donor-DU is configured with the mapping rule, i.e. IAB's IP address→Destination IAB node address. But this cannot be used for DL DHCP, since the IAB does not have an IP address yet and the destination address of the DHCP packet is a broadcast address 0xffffffff. Even in case the destination address of the DL DHCP packet is a unicast address, e.g. when send DHCPACK, the Donor-DU does not know the Destination IAB node address. It is questionable on how the Donor-DU set the adaptation header when send the DL DHCP packet to the IAB.

IP address management during Topology Adaptation

The parent IAB node may perform a Topology Adaptation, which may be one of the following scenarios

- Intra-Donor-DU Topology Adaptation: The parent IAB node still connect to the same Donor-DU, thus the IAB node does not need to change the IP address.
- Inter-Donor-DU Topology Adaptation: The parent IAB node connects to a different Donor-DU, thus the IAB node need to change the IP address.

The IAB node has no idea whether the topology adaptation has changed the Donor-DU, so the IAB node cannot know whether it need to initiate DHCP procedure to get a new IP address.

Additional delay

Unlike Option 2 that the IP address can be part of the RRC message for BH RLC channel establishment, the DHCP procedure is only performed after the BH RLC channel is setup. This delay may be argued to be neglect able in the initial connection, but this cannot be neglected during the topology adaptation which it adds additional delay, especially in multiple-hop case.

Handling for DHCP parameters

It is unclear on how to handle the DHCP parameters. For example, when the DHCP client send the DHCP DISCOVER, the client MUST include its hardware address in the 'chaddr' field, if necessary for delivery of DHCP reply messages. The hardware address has an associated Hardware address type htype, which is defined by IANA. It is unclear which value will be used for htype.

For Option 2, all issues mentioned for Option 1 can be easily addressed. The IP address is included in the RRC message to configure the BH RLC channel, so there is no need for separate BH RLC channel, or additional mapping rule, or additional delay, etc.

In summary, Option 2 has less impact, and is preferred.

Proposal: RAN3 adopt Option 2 (using RRC to configure the IAB's IP address).

Contribution R3-193563 to RAN3#105

Both options of IP address allocation in the context of parent node change is considered:

Option 1: IP address is allocated by IAB-donor DU via DHCP.

The DHCP messages need to be carried on the BAP layer. This implies that:

- A transport mechanism is defined by RAN2 for DHCP on top of BAP. This creates significant specification overhead.
- DHCP handshake cannot begin before the BH RLC channels and BAP route are established on the target path (i.e. after step A). The sequential dependency of IP address allocation on BAP route availability adds significant delay to the parent-node change procedure.

Option 2: IP address is allocated by IAB-Donor CU

In this case, the CU can configure a new IP address using one of the messages such as UE context transfer (step 5) or BAP route establishment (step A). This only requires minor specification effort. There is no additional delay for IP address assignment.

Observation 1: IP address assignment by the IAB-Donor CU requires less specification effort and lower latency to parent node change over IP address assignment via IAB-donor DU using DHCP.

Proposal 2: RAN3 should agree that IP address for IAB-node DU is assigned by CU.

There currently exist certain challenge(s). In particular, as discussed above there is a number of contributions to the RAN3#105 proposing that the allocation of the IP address to the IAB nodes is triggered and done by the CU. In these proposals, RRC signaling from CU to IAB node is used to send the allocated IP address. Additionally, in some proposals, the IP address is allocated from a pool of IP addresses available at the CU. The problems with these proposed solutions are the following:

Support for Multiple IP Address for the IAB Node:

As discussed in R3-193739 submitted to the same meeting, currently 3GPP DUs can support any number of IP addresses. E.g. multiple IP addresses for OAM, F1-C, F1-U, etc. It is beneficial if a similar principle should also apply for IAB nodes DUs since this allows IAB nodes to split their signaling and data over multiple IP address and network interface cards. No solution has been provided for how the CU would be able to know how many IP addresses should be allocated to the IAB node. It has been assumed that the IAB node should only have one IP address.

Lack of CUs Knowledge about Transport Network Topologies:

Contrary to what has been discussed in 3GPP, the CU may not be in a good place to allocate IP addresses to IAB nodes. This is because the CU could be located in a central cloud environment and lack the knowledge about which IP addresses should be used in a distributed part of the network. Currently it is not the responsibility of the CU to know the transport network topology, including the corresponding IP subnets and network prefixes. Introducing such functionality could have a big impact on the operation of CUs, which could increase the cost of network management for the operator.

The existing mechanisms used to allocate IP addresses to the CU itself such as DHCP, cloud orchestration etc cannot easily be extended to allocate IP addresses to distributed DUs or IAB nodes located somewhere else in the IP network since it would require knowledge about the transport network topology which is currently most likely not available.

For existing CU-DU split the CU does not have the functionality to allocate IP address to the DUs or to know anything about the transport topology. Given the arguments above and in the desire to maximize the similarities between IAB-DU nodes and normal DUs i.e. avoid IAB specific impacts to CUs, it is beneficial to keep this principle.

Support for Topology Change or IAB Node Mobility/Migration:

One of the arguments used to motivate prior solutions using CU allocation of IP addresses is that CU based allocation of IP address is more efficient than DHCP or OAM based method in case an IAB node is moved from one parent node to another. The argument is based on the claim that the CU could allocate the new IP address quickly at IAB node mobility and then send this allocation to the IAB node in an RRC message e.g. prior to the actual move. In this way the IAB node is ready to communicate with the CU directly after the node. Unfortunately, no solution is provided for how to perform IP address allocation in an equally efficient way as using CU based allocation, but without the associated drawbacks of CU based allocation discussed in this section.

Accordingly, certain aspects of the present disclosure and their embodiments may provide solutions to these or other challenges. In general, it is proposed herein that the allocation of IP addresses in Donor DU, most likely the request mechanism from IAB node to Donor CU to Donor DU also should be included in the core mechanism. Methods to allocate multiple IP addresses are also important. The solution proposed herein introduces a mechanism for performing IP address allocation at initial connection setup as well as IP address re-allocation at mobility without relying on CU triggered allocation of IP addresses as suggested in prior discussions. In the above, mobility refers to both physical mobility of IAB nodes, as well as the change of topology caused by, for example, link failure, overload, node failure etc.

The solution to reduce and/or alleviate the problems described herein is based on the following aspects.

The IP address(es) of the IAB node 100 are allocated by the IAB Donor DU 106 (using OAM 114 or DHCP based method described above). At mobility, the new IP addresses are allocated by the target Donor DU 106.

In various embodiments of inventive concepts, the trigger for the Donor DU 106 to allocate the IP address(es) is be based on receiving an F1-AP message from the Donor CU 108 implicitly or explicitly requesting the allocation.

The F1-AP message could also configure other aspects such as BH RLC channels or BAP addresses for the IAB node.

In other various embodiments of inventive concepts, as an outcome of the allocation, the allocated IP address(es) can be associated with one or more backhaul adaptation protocol (BAP) addresses of the IAB node 100 in the Donor DU 106. This association can later be used in the Donor DU 106 to map DL IP packet(s) addressed to one of the allocated IP addresses to the correct BAP address within the IAB network.

The allocated IP address(es) are then signaled to the Donor CU 108 using F1-AP message or directly to the IAB node 100 e.g. using a BAP message, or other message.

The F1-AP message can be sent in a response to a message from the Donor CU 108 to the Donor DU 106.

The Donor CU 108 can in response to receiving the IP address(es) send the IP address(es) to the IAB node 100 in an RRC or F1-AP message.

In various embodiments of inventive concepts, the IAB node 100 can send a message to the Donor CU 108 requesting the allocation of 1 or more IP addresses. The message can include an integer indicating how many IP addresses should be allocated. The message could be an RRC or F1-AP message.

In response to receiving a message from the IAB node 100 requesting IP addresses the Donor CU 108 may send a message to the Donor DU 1108 to request IP address allocation. This message could also include an integer indicating how many IP addresses are requested. This message could be an F1-AP message or other message.

In response to a mobility event related to the IAB node 100 (e.g, handover preparation, RRC re-establishment, RRC setup) the Donor CU 108 may send a message to a Donor DU 106 to request IP address allocation or re-allocation. This message could also include an integer indicating how many IP addresses are requested.

The number of IP addresses requested could be based on knowledge of how many IP addresses the IAB node 100 is currently allocated or based on knowledge from previously received allocation requests to the Donor CU 108 from the IAB node 100. It could also be based on the number of IP addresses allocated by the Donor DU 106 previously for this IAB node 100.

Certain embodiments may provide one or more of the following technical advantage(s). For example, in certain embodiments the inventive concepts described herein may support efficient signaling for IP address allocation to IAB nodes, while avoiding the need to allocate the IP address by the Donor CU, meaning that the Donor CU is not required to know anything about the IP network topology. The solution may also allow the allocation of multiple IP addresses to IAB nodes, which is desirable since this is supported for DUs today and it is desirable to maximize similarities between DUs and IAB nodes to reduce network and implementation complexity. Multiple IP addresses can be used for internal load sharing between different hardware components or boards or modules within the IAB node or at the IAB site.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix. The proposed solution has the following characteristics:

Instead of allocating the IP addresses in the Donor CU 108, the IP addresses are allocated by the Donor DU 106. This is advantageous since the Donor DU 106 will have means to allocate IP addresses which are routable to the Donor DU 106 which is difficult or not possible for the Donor CU 108 to do. The actual allocation of IP address could be done by the Donor DU 106 sending a DHCP request to a local DHCP server, or the Donor DU 106 asking its OAM system for one or more IP addresses. It could also be so that the Donor DU 106 has been pre-configured with a range of IP addresses it can allocate.

An added advantage of allocating the IP address(es) in the Donor DU 106 is that the Donor DU 106 can associate the IP addresses with the BAP identifier which is configured in the Donor DU 106 for the IAB node 100. In this way it is not required to separately signal the mapping between IP address(es) to the Donor DU 106, which would be the case if the Donor CU 108 allocated the IP addresses for the IAB node 100.

The trigger for the Donor DU 106 to allocate the IP address could be a message from the Donor CU 108. This could be used at initial configuration of the IAB link, or at IAB node mobility, e.g. when the IAB node 100 moves into a new Donor DU 106 (or a child IAB node 100 of a Donor DU 106). An advantage of supporting this trigger is that the IP allocation can be quickly performed at setup and mobility, since the Donor CU 108 will know when the IAB node 100 connects for first time, and it will also know when the IAB node 100 is moving to a new node.

In order to support the allocation of multiple IP addresses (which is not currently supported in existing solutions) the Donor CU 108 can indicate in a message to the Donor DU 106 how many IP addresses the Donor DU 106 should allocate.

When the Donor DU 106 has allocated the IP addresses, there are multiple ways on how the IP addresses can be conveyed to the IAB node 100.

For example, the IP addresses can be sent to the Donor CU 108 e.g. in an F1-AP message. The Donor CU 108 could then send the addresses to the IAB node 100 either in an F1-AP message or in an RRC message. The method to allocate the IP addresses, and the fact that multiple IP addresses can be allocated in this way is also different.

Alternatively, the Donor DU 106 can send the IP addresses directly the IAB node 100, e.g. using DHCP or a BAP message. Sending the IP addresses using DHCP has been proposed previously, but in that solution the triggering for DHCP was different than this proposal where the triggering comes from the Donor CU 108.

Another inventive concept of this solution is that the IAB node 100 can send a message to the Donor CU 108 requesting the allocation of 1 or more IP addresses. The message can include an integer indicating how many IP addresses should be allocated. The message could also include additional information indicating for what the IP address will be used for (e.g. OAM, F1-AP signaling) which could be used in the network to prioritize the allocation. The message could be an RRC or F1-AP message. This is beneficial since it allows the IAB node 100 to request IP addresses at any time, and also request multiple IP addresses. For example, if the IAB node 100 offers support for other devices or network equipment to connect to the network via a generic IP backhaul service, the IAB node 100 could, when the new equipment connects (e.g. via an Ethernet port), request an IP address for the new equipment. The IAB node 100 can then allocate the IP address to the new equipment e.g. using DHCP.

When the Donor CU 108 receives a message from IAB node requesting IP addresses the Donor CU 108 could send a message to the Donor DU 106 to request IP address allocation. This message could also include an integer indicating how many IP addresses is requested. This message could be an F1-AP message or other type of message. An advantage that may be provided is that the Donor CU 108 does not need to trigger the allocation of IP addresses itself, i.e. it does not need to know when and how many IP addresses the IAB node 100 needs which is very difficult for the Donor CU 108 to know, instead the Donor CU 108 just triggers a request to the Donor DU 106 whenever it gets a request from the IAB node 100.

Another inventive concept is that the Donor CU 108 can trigger the re-allocation of IP addresses in response to some mobility event for the IAB node 100. The principle is similar to initial allocation of IP addresses where the Donor CU 108 sends a message to the Donor DU 106 to request new IP addresses. In this case, the Donor DU 106 is the target or new Donor DU 106 which the IAB node 100 will use after the mobility event. The mechanism to convey the IP addresses to the IAB node 100 can be the same as previously described. In order to allocate the correct number of IP addresses, it is possible for the Donor CU 108 to request the same number as previously. Other embodiments could include querying the IAB node 100 on how many addresses are needed. The advantage of this solution is that it is very fast meaning it can reduce the service interruption by the mobility event. It can even be performed in preparation for the mobility event e.g. before the radio handover. Multiple mobility events can be considered, including the following:

- Prepared handover when the IAB node 100 has sent a measurement report to the CU 108 indicating that a different parent cell is better or cases when the CU 108 wants to move the IAB node 100 for load balancing purposes.
- Fallback/recovery e.g. when the IAB node has 100 experienced a link failure to its parent cell and initiated an RRC re-establishment in a new cell.
- Re-direct, e.g. where the IAB node 100 is re-directed to a different cell or frequency layer by the CU 108.

Operations of the donor DU node 106 (implemented using the structure of the block diagram of FIG. 11) will now be discussed with reference to the flow chart of FIG. 13 according to some embodiments of inventive concepts. For example, modules may be stored in memory 1105 of FIG. 11, and these modules may provide instructions so that when the instructions of a module are executed by respective communication device processing circuitry 1103, processing circuitry 1103 performs respective operations of the flow chart.

Figure 13:
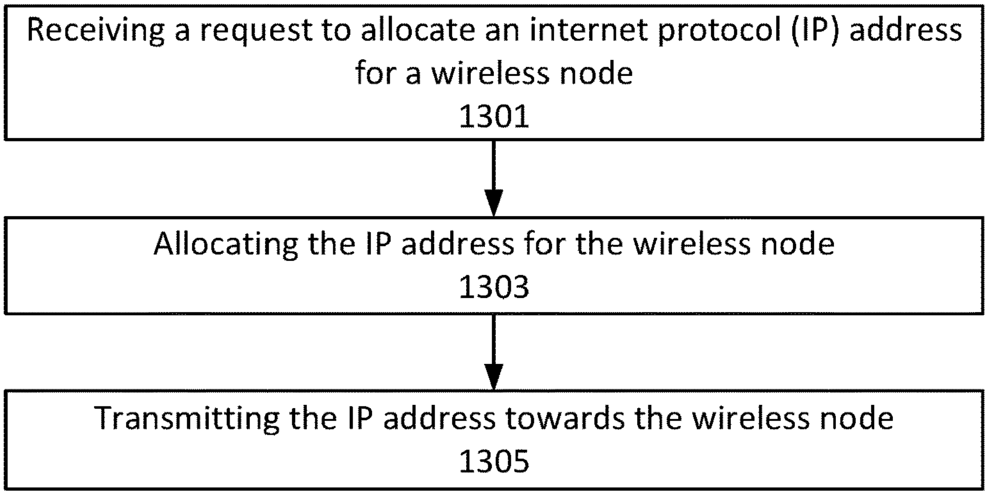
FIGS. 13-17 are flow charts illustrating operations of a donor DU node according to some embodiments of inventive concepts.

Turning to FIG. 13, in block 1301, the processing circuitry 1103 receives a request to allocate an internet protocol (IP) address for a wireless node. The wireless node may be an IAB node. The request may be received from a donor CU node 108.

Figure 14:
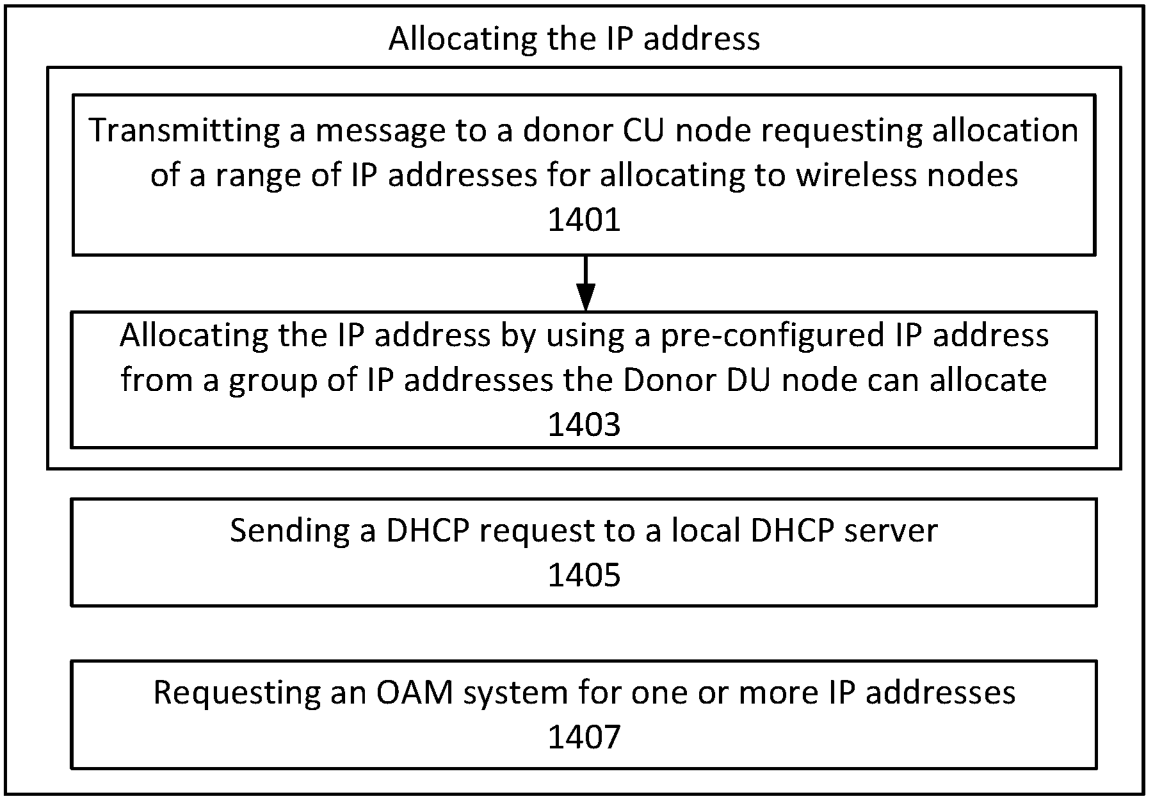

In block 1303, the processing circuitry 1103 allocates the IP address for the wireless node. Turning to FIG. 14, in one embodiment, prior to allocating the IP address, the processing circuitry 1103 may, in block 1401 transmit a message to a donor CU node 108 requesting allocation of a range of IP addresses for allocating to wireless nodes. The range of IP addresses are a group pre-configured IP addresses the donor DU node 106 can use to allocated IP addresses. The message may include an integer indicating a number of IP addresses to be allocated to the wireless node, wherein the number of IP addresses is based on knowledge of on how many IP addresses the wireless node is currently allocated and/or knowledge of how many IP addresses the donor DU node previously allocated for the wireless node. In block 1403, the processing circuitry 1103 may allocate the IP address by using a pre-configured IP address from a group of IP addresses the donor DU 106 can allocate. In some embodiments of inventive concepts, the processing circuitry 1103 can allocate the IP address using an operations, administration, and maintenance (OAM) configuration or a dynamic host control protocol (DHCP) based method. For example, the processing circuitry 1103 in block 1405 may sends a DHCP request to a local DHCP server to allocate the IP address. The processing circuitry 1103 in block 1407 may request an OAM system for one or more IP addresses.

Returning to FIG. 13, in block 1305, the processing circuitry 1103 transmits the IP address towards the wireless node. For example, the processing circuitry 1103 may transmit the IP address for the wireless node to the donor CU node (108) to forward the IP address to the wireless node.

Figure 15:
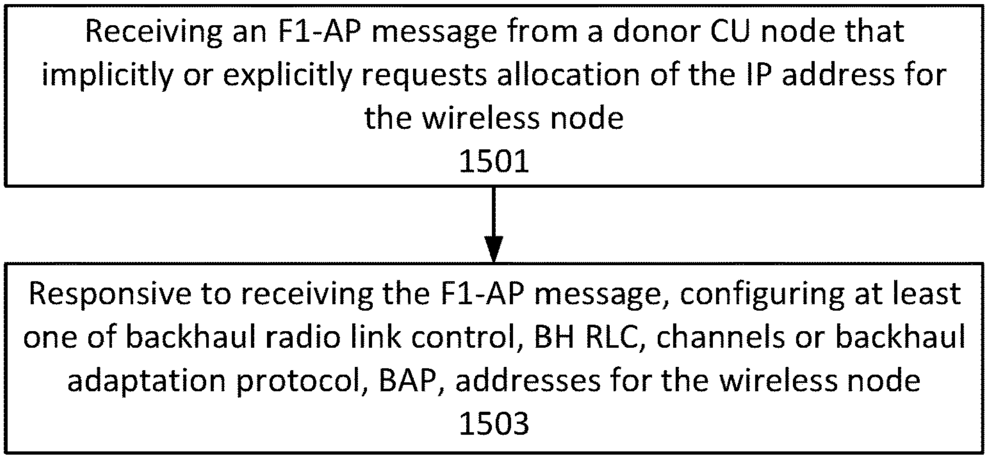

As indicated above, the request to allocate the IP addressed may be received from a donor CU node 108. Turning to FIG. 15, in various other embodiments of inventive concepts, the processing circuitry 1103 in block 1501 can receive an F1-Application Protocol (F1-AP) message from a donor central unit, CU, node 108 that implicitly or explicitly requests allocation of the IP address for the wireless node.

In block 1503, the processing circuitry 1103 can, responsive to receiving the F1-AP message, configure at least one of backhaul radio link control (BH RLC) channels or backhaul adaptation protocol (BAP), addresses for the wireless node. In some of these embodiments, the IP address may be associated with one or more BAP addresses of the wireless node in the Donor DU node (106).

Figure 16:
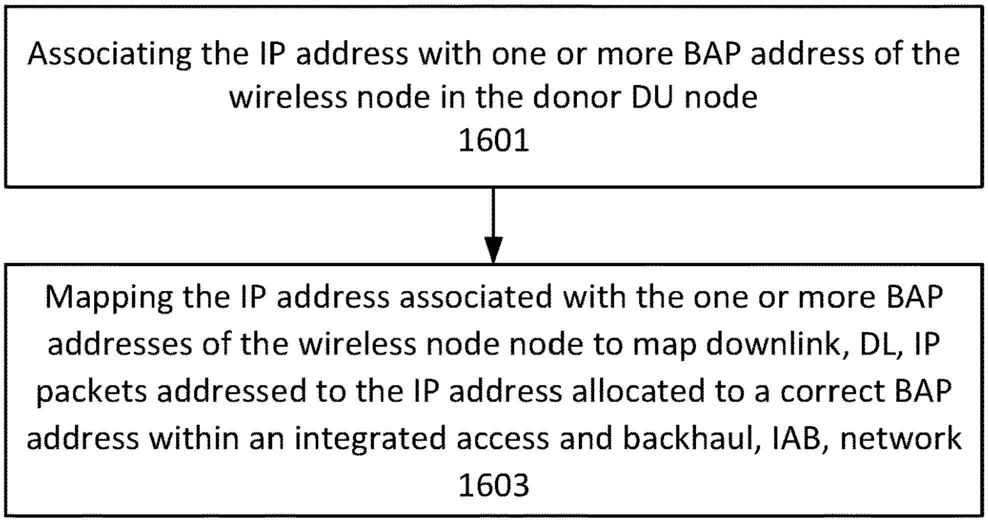

Turning to FIG. 16, in some other embodiments, the processing circuitry 1103 can associate (1601) the IP address with the one or more BAP addresses of the wireless node. In block 1603, the processing circuitry 1103 may map the IP address associated with the one or more BAP addressed of the wireless node to map downlink, DL, IP packets addressed to the IP address allocated to a correct BAP address within an integrated access and backhaul, IAB, network.

Figure 17:
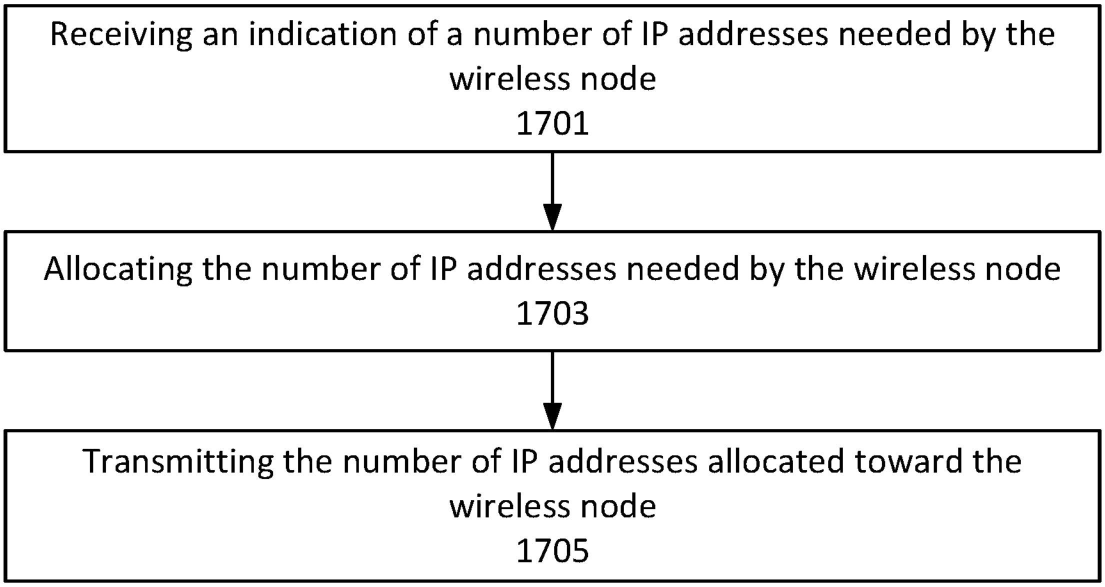

In yet other embodiments of inventive concepts, the wireless node may need more than one IP address. This allows the wireless node to split their signaling and data over multiple IP addresses and network interface cards. Turning now to FIG. 17, in block 1701, the processing circuitry 1103 receives an indication of a number of IP addresses needed by the wireless node. In block 1703, the processing circuitry 1103 allocates the number of IP addresses needed by the wireless node. In block 1705, the processing circuitry 1103 transmits the number of IP addresses allocated towards the wireless node.

Operations of a donor CU node 108 (implemented using the structure of FIG. 12) will now be discussed with reference to the flow chart of FIG. 18 according to some embodiments of inventive concepts. For example, modules may be stored in memory 1205 of FIG. 12, and these modules may provide instructions so that when the instructions of a module are executed by respective donor CU node processing circuitry 1203, processing circuitry 1203 performs respective operations of the flow chart.

Figure 18:
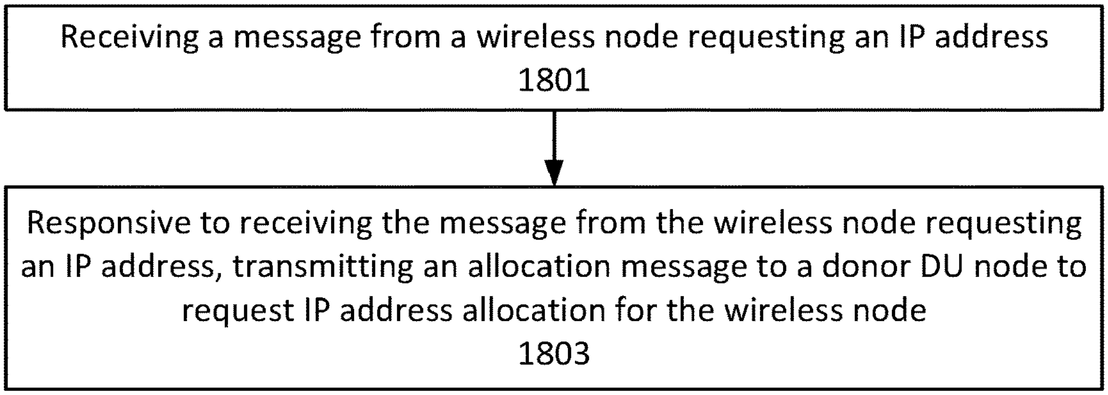
FIGS. 18-20 are flow charts illustrating operations of a donor CU node according to some embodiments of inventive concepts.

Turning now to FIG. 18, in block 1801, the processing circuitry 1203 receives a message from a wireless node requesting an IP address. The wireless node may be a wireless device or a base station. The message may include a message that includes an integer indicating how many IP addresses are requested. In some embodiments, receiving the message from the wireless node requesting an IP address includes receiving an indication of what the IP address will be used for. The processing circuitry 1203 can prioritize allocation of the IP address based on the indication.

Responsive to receiving the message from the wireless node, the processing circuitry 1203 in block 1803 transmits an allocation message to a donor distributed unit (DU) node 106 to request IP address allocation from the wireless node. In some embodiments, the processing circuitry 1203 includes, in the allocation message, an integer indicating how many IP addresses are requested.

Figure 19:
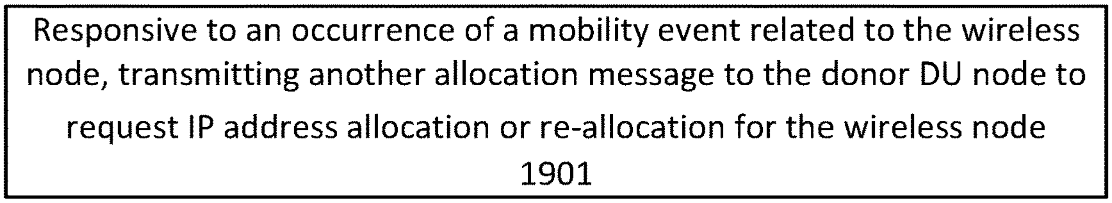

An allocation message for the wireless node may also be transmitted to the donor DU node 106 for other reasons. For example in block 1901 (see FIG. 19), the processing circuitry 1203 can responsive to an occurrence of a mobility event related to the wireless node, transmit another allocation message to the donor DU node (106) to request IP allocation or re-allocation for the wireless node. The mobility event could be one of a handover preparation, a radio resource control (RRC) re-establishment, and a RRC setup.

Figure 20:
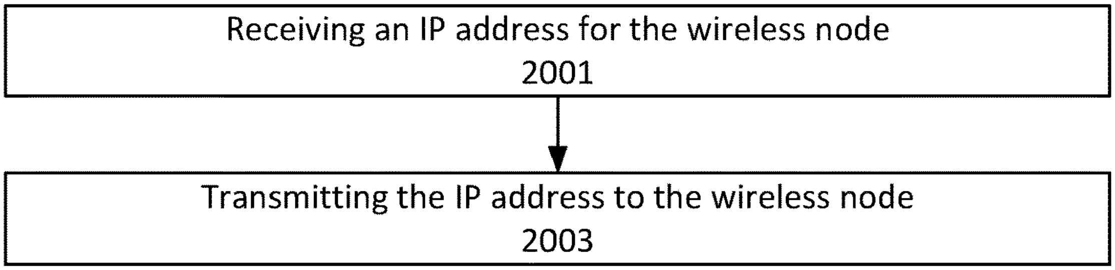

Turning to FIG. 20, in some embodiments, the processing circuitry 1203 receives in block 2001, an IP address for the wireless node. The IP address may come from the donor DU node 106 responsive to the processing circuitry 120 sending the allocation message to the donor DU node 106.

In block 2003, the processing circuitry 1203 transmits the IP address to the wireless node. The processing circuitry 1203 may receive multiple IP addresses for the wireless node and transmit the multiple IP addresses to the wireless node.

Operations of a wireless node 100 (implemented using the structure of FIG. 10) will now be discussed with reference to the flow chart of FIG. 21 according to some embodiments of inventive concepts. For example, modules may be stored in memory 1005 of FIG. 10, and these modules may provide instructions so that when the instructions of a module are executed by respective wireless node processing circuitry 1003, processing circuitry 1003 performs respective operations of the flow chart.

Figure 21:
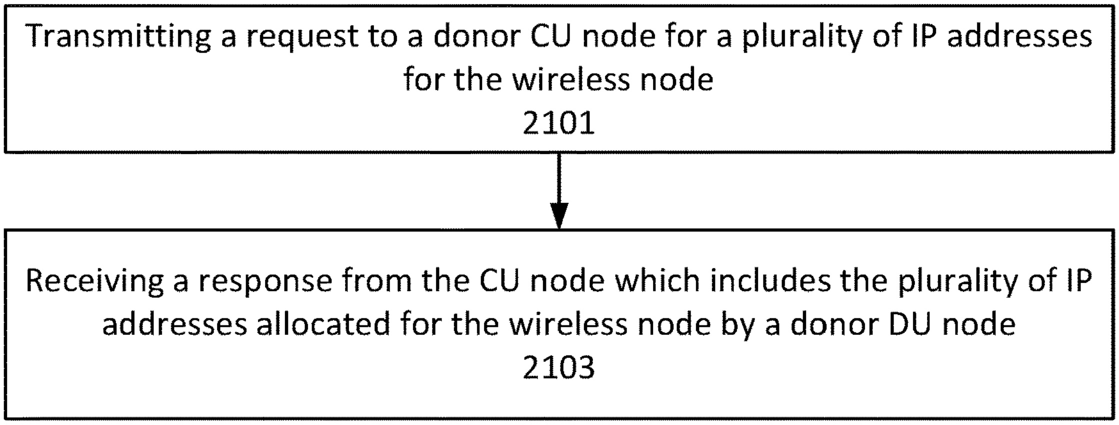
FIG. 21 is a flow chart illustrating operations of a wireless node (e.g, an IAB node) according to some embodiments of inventive concepts.

Turning to FIG. 21, in block 2101, the processing circuitry 1003 transmits a request to the donor CU node 108 for a plurality of IP addresses for the wireless node 100. In block 2103, the processing circuitry 1003 receives a response from the donor CU node 108 which includes the plurality of IP addresses allocated for the wireless node by a donor DU node 106.

Example embodiments are discussed below.

EMBODIMENTS

Group A Embodiments

Embodiment 1

A method performed by a wireless device for allocating IP addresses, the method comprising:

- receiving at the wireless device an IP address, the IP address received from a Donor DU.

Embodiment 2

The method of Embodiment 1 wherein:

- receiving at the wireless device an IP address comprises receiving the IP address during mobility; and
- the Donor DU is a target Donor DU.

Embodiment 3

The method of one or more of Embodiments 1-2 wherein the IP address is allocated using OAM or DHCP based method.

Embodiment 4

The method of one or more of Embodiments 1-3 wherein the Donor DU sends the IP address based on receiving an F1-AP message from the Donor CU implicitly or explicitly requesting the allocation.

Embodiment 5

The method of Embodiment 4 wherein the F1-AP message also configures other aspects such as BH RLC channels or BAP addresses for the IAB node.

Embodiment 6

The method of one or more of Embodiments 1-5 wherein the IP address is associated with one or more BAP address of the wireless device in the Donor DU.

Embodiment 7

The method of Embodiment 6 wherein the association is used in the Donor DU to map DL IP packet addressed to one of the allocated IP addresses to the correct BAP address within an IAB network.

Embodiment 8

The method of one or more of Embodiments 1-7 wherein the allocated IP address is signaled to the Donor CU using F1-AP message or directly to the wireless device.

Embodiment 9

The method of Embodiment 8 wherein the signaling comprises a BAP message, or other message.

Embodiment 10

The method of one or more of Embodiments 8-9 wherein the message is sent in a response to a message from the Donor CU to the Donor DU.

Embodiment 11

The method of one or more of Embodiments 1-10 wherein the Donor CU, in response to receiving the IP address, sends the IP address to the wireless device in an RRC or F1-AP message.

Embodiment 12

The method of one or more of Embodiments 1-11 further comprising transmitting a message to the CU requesting the allocation of 1 or more IP addresses.

Embodiment 13

The method of 12 wherein the message includes an integer indicating how many IP addresses should be allocated.

Embodiment 14

The method of one or more of Embodiments 12-13 wherein the message is an RRC or F1-AP message.

Embodiment 15

The method of one or more of Embodiments 1-14 wherein in response to receiving a message from the wireless device requesting an IP address, the CU sends a message to the Donor DU to request IP address allocation.

Embodiment 16

The method of Embodiment 15 wherein the message includes and integer indicating how many IP addresses are requested.

Embodiment 17

The method of one or more of Embodiments 15-16 wherein the message is an F1-AP message or other.

Embodiment 18

The method of one or more of Embodiments 1-17 wherein in response to a mobility event related to the wireless device (e.g, handover preparation, RRC re-establishment, RRC setup) the Donor CU sends a message to a Donor DU to request IP address allocation or re-allocation.

Embodiment 19

The method of Embodiment 18 wherein the message includes an integer indicating how many IP addresses are requested.

Embodiment 20

The method of one or more of Embodiments 1-19 wherein the number of IP addresses is based on knowledge on how many IP addresses the wireless device is currently allocated.

Embodiment 21

The method of one or more of Embodiments 1-19 wherein the number of IP addresses is based on knowledge from previously received allocation request to the Donor CU from the wireless device.

Embodiment 22

The method of one or more of Embodiments 1-19 wherein the number of IP addresses is based on the number of IP addresses allocated by the Donor DU previously for the wireless device.

Embodiment 23

The method of one or more of Embodiments 1-22 wherein the IP address is allocated by the Donor DU.

Embodiment 24

The method of one more of Embodiments 1-23 wherein the IP address is routable to the Donor DU.

Embodiment 25

The method of one or more of Embodiments 1-24 wherein the IP address is allocated by the Donor DU sending a DHCP request to a local DHCP server, or the Donor DU requests its OAM system for one or more IP addresses, or the Donor DU has been pre-configured with a range of IP addresses it can allocate.

Embodiment 26

The method of one or more of Embodiments 1-25 wherein the Donor DU associates the IP address with the BAP identifier which is configured in the Donor DU for the wireless device.

Embodiment 27

The method of one or more of Embodiments 1-26 wherein the IP address is allocated in response to a message from the CU.

Embodiment 28

The method of one or more of Embodiments 1-27 wherein the IP allocation is performed at setup of a connection.

Embodiment 29

The method of one or more of Embodiments 1-28 wherein the IP address can be sent to the Donor CU in an F1-AP message.

Embodiment 30

The method of one or more of Embodiments 1-29 wherein the Donor CU sends the IP address to the wireless device either in an F1-AP message or in an RRC message.

Embodiment 31

The method of one or more of Embodiments 1-30 wherein the Donor DU sends the IP address directly to the wireless device using DHCP or a BAP message.

Embodiment 32

The method of Embodiment 31 wherein the IP address is sent using DHCP based on a triggering event from the Donor CU.

Embodiment 33

The method of one or more of Embodiments 1-32 wherein wireless device indicate what the IP address will be used for (e.g. OAM, F1-AP signaling).

Embodiment 34

The method of Embodiment 33 wherein the indication is used to prioritize the allocation.

Embodiment 35

The method of one or more of Embodiments 1-34 further comprising establishing a new connection with a new device, the new connection needing a new IP address.

Embodiment 36

The method of one or more of Embodiments 1-35 wherein the Donor CU requests the IP address from the Donor DU when the Donor CU receives a request from the wireless device.

Embodiment 37

The method of any of Embodiments 1-36 further comprising receiving a query asking how many IP address the wireless device wants.

Embodiment 38

The method of any of Embodiments 1-37 wherein the IP address is allocated in preparation for a mobility event (e.g. before the radio handover).

Embodiment 39

The method of one or more of Embodiments 1-38 wherein the mobility event comprises one of:

- a prepared handover when the wireless device has sent a measurement report to the CU indicating that a different parent cell is better or cases when the CU wants to move the wireless device for load balancing purposes;
- fallback/recovery e.g. when the wireless device has experienced a link failure to its parent cell and initiated an RRC re-establishment in a new cell; or
- re-direct, e.g. where the wireless device is re-directed to a different cell or frequency layer by the CU.

Embodiment 40

The method of Embodiments 1-39 wherein the wireless device is an IAB node.

Embodiment 41

The method of any of the previous Embodiments, further comprising:

- providing user data; and
- forwarding the user data to a host computer via the transmission to the base station.

Group B Embodiments

Embodiment 42

A method performed by a base station for allocating IP addresses, the method comprising:

- receiving at the base station an IP address, the IP address received from a Donor DU.

Embodiment 43

The method of Embodiment 42 wherein:

- receiving at the base station an IP address comprises receiving the IP address during mobility; and
- the Donor DU is a target Donor DU.

Embodiment 44

The method of one or more of Embodiments 42-43 wherein the IP address is allocated using OAM or DHCP based method.

Embodiment 45

The method of one or more of Embodiments 42-44 wherein the Donor DU sends the IP address based on receiving an F1-AP message from the Donor CU implicitly or explicitly requesting the allocation.

Embodiment 46

The method of Embodiment 45 wherein the F1-AP message also configures other aspects such as BH RLC channels or BAP addresses for the IAB node.

Embodiment 47

The method of one or more of Embodiments 42-46 wherein the IP address is associated with one or more BAP address of the base station in the Donor DU.

Embodiment 48

The method of Embodiment 47 wherein the association is used in the Donor DU to map DL IP packet addressed to one of the allocated IP addresses to the correct BAP address within an IAB network.

Embodiment 49

The method of one or more of Embodiments 42-48 wherein the allocated IP address is signaled to the Donor CU using F1-AP message or directly to the base station.

Embodiment 50

The method of Embodiment 49 wherein the signaling comprises a BAP message, or other message.

Embodiment 51

The method of one or more of Embodiments 49-50 wherein the message is sent in a response to a message from the Donor CU to the Donor DU.

Embodiment 52

The method of one or more of Embodiments 42-51 wherein the Donor CU, in response to receiving the IP address, sends the IP address to the base station in an RRC or F1-AP message.

Embodiment 53

The method of one or more of Embodiments 42-52 further comprising transmitting a message to the CU requesting the allocation of 1 or more IP addresses.

Embodiment 54

The method of Embodiment 53 wherein the message includes an integer indicating how many IP addresses should be allocated.

Embodiment 55

The method of one or more of Embodiments 53-54 wherein the message is an RRC or F1-AP message.

Embodiment 56

The method of one or more of Embodiments 42-55 wherein in response to receiving a message from the base station requesting an IP address, the CU sends a message to the Donor DU to request IP address allocation.

Embodiment 57

The method of Embodiment 56 wherein the message includes and integer indicating how many IP addresses are requested.

Embodiment 58

The method of one or more of Embodiments 56-57 wherein the message is an F1-AP message or other.

Embodiment 59

The method of one or more of Embodiments 42-58 wherein in response to a mobility event related to the base station (e.g, handover preparation, RRC re-establishment, RRC setup) the Donor CU sends a message to a Donor DU to request IP address allocation or re-allocation.

Embodiment 60

The method of Embodiment 59 wherein the message includes an integer indicating how many IP addresses are requested.

Embodiment 61

The method of one or more of Embodiments 42-60 wherein the number of IP addresses is based on knowledge on how many IP addresses the base station is currently allocated.

Embodiment 62

The method of one or more of Embodiments 42-60 wherein the number of IP addresses is based on knowledge from previously received allocation request to the Donor CU from the base station.

Embodiment 63

The method of one or more of Embodiments 42-60 wherein the number of IP addresses is based on the number of IP addresses allocated by the Donor DU previously for the base station.

Embodiment 64

The method of one or more of Embodiments 42-63 wherein the IP address is allocated by the Donor DU.

Embodiment 65

The method of one more of Embodiments 42-64 wherein the IP address is routable to the Donor DU.

Embodiment 66

The method of one or more of Embodiments 42-65 wherein the IP address is allocated by the Donor DU sending a DHCP request to a local DHCP server, or the Donor DU requests its OAM system for one or more IP addresses, or the Donor DU has been pre-configured with a range of IP addresses it can allocate.

Embodiment 67

The method of one or more of Embodiments 42-66 wherein the Donor DU associates the IP address with the BAP identifier which is configured in the Donor DU for the base station.

Embodiment 68

The method of one or more of Embodiments 42-67 wherein the IP address is allocated in response to a message from the CU.

Embodiment 69

The method of one or more of Embodiments 42-68 wherein the IP allocation is performed at setup of a connection.

Embodiment 70

The method of one or more of Embodiments 42-69 wherein the IP address can be sent to the Donor CU in an F1-AP message.

Embodiment 71

The method of one or more of Embodiments 42-70 wherein the Donor CU sends the IP address to the base station either in an F1-AP message or in an RRC message.

Embodiment 72

The method of one or more of Embodiments 42-71 wherein the Donor DU sends the IP address directly to the base station using DHCP or a BAP message.

Embodiment 73

The method of Embodiment 72 wherein the IP address is sent using DHCP based on a triggering event from the Donor CU.

Embodiment 74

The method of one or more of Embodiments 42-73 wherein base station indicate what the IP address will be used for (e.g. OAM, F1-AP signaling).

Embodiment 75

The method of Embodiment 74 wherein the indication is used to prioritize the allocation.

Embodiment 76

The method of one or more of Embodiments 42-75 further comprising establishing a new connection with a new device, the new connection needing a new IP address.

Embodiment 77

The method of one or more of Embodiments 42-76 wherein the Donor CU requests the IP address from the Donor DU when the Donor CU receives a request from the base station.

Embodiment 78

The method of any of Embodiments 42-77 further comprising receiving a query asking how many IP address the base station wants.

Embodiment 79

The method of any of Embodiments 42-78 wherein the IP address is allocated in preparation for a mobility event (e.g. before the radio handover).

Embodiment 80

The method of one or more of Embodiments 42-79 wherein the mobility event comprises one of:
- a prepared handover when the base station has sent a measurement report to the CU indicating that a different parent cell is better or cases when the CU wants to move the base station for load balancing purposes;
- fallback/recovery e.g. when the base station has experienced a link failure to its parent cell and initiated an RRC re-establishment in a new cell; or
- re-direct, e.g. where the base station is re-directed to a different cell or frequency layer by the CU.

Embodiment 81

The method of Embodiments 42-80 wherein the base station is an IAB node.

Embodiment 82

The method of any of the previous Embodiments, further comprising:
- obtaining user data; and
- forwarding the user data to a host computer or a wireless device.

Group C Embodiments

Embodiment 83

A wireless device for allocating IP addresses, the wireless device comprising:
- processing circuitry configured to perform any of the steps of any of the Group A embodiments; and
- power supply circuitry configured to supply power to the wireless device.

Embodiment 84

A base station for allocating IP addresses, the base station comprising:
- processing circuitry configured to perform any of the steps of any of the Group B embodiments;
- power supply circuitry configured to supply power to the base station.

Embodiment 85

A user equipment (UE) for allocating IP addresses, the UE comprising:
- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

Embodiment 86

A communication system including a host computer comprising:
- processing circuitry configured to provide user data; and
- a communication interface configured to forward the user data to a cellular network for transmission to a user equipment (UE),
- wherein the cellular network comprises a base station having a radio interface and processing circuitry, the base station's processing circuitry configured to perform any of the steps of any of the Group B embodiments.

Embodiment 87

The communication system of the previous embodiment further including the base station.

Embodiment 88

The communication system of the previous 2 embodiments, further including the UE, wherein the UE is configured to communicate with the base station.

Embodiment 89

The communication system of the previous 3 embodiments, wherein:

the processing circuitry of the host computer is configured to execute a host application, thereby providing the user data; and the UE comprises processing circuitry configured to execute a client application associated with the host application.

Embodiment 90

A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

Embodiment 91

The method of the previous embodiment, further comprising, at the base station, transmitting the user data.

Embodiment 92

The method of the previous 2 embodiments, wherein the user data is provided at the host computer by executing a host application, the method further comprising, at the UE, executing a client application associated with the host application.

Embodiment 93

A user equipment (UE) configured to communicate with a base station, the UE comprising a radio interface and processing circuitry configured to performs the of the previous 3 embodiments.

Embodiment 94

A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Embodiment 95

The communication system of the previous embodiment, wherein the cellular network further includes a base station configured to communicate with the UE.

Embodiment 96

The communication system of the previous 2 embodiments, wherein:

the processing circuitry of the host computer is configured to execute a host application, thereby providing the user data; and the UE's processing circuitry is configured to execute a client application associated with the host application.

Embodiment 97

A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

Embodiment 98

The method of the previous embodiment, further comprising at the UE, receiving the user data from the base station.

Embodiment 99

A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

Embodiment 100

The communication system of the previous embodiment, further including the UE.

Embodiment 101

The communication system of the previous 2 embodiments, further including the base station, wherein the base station comprises a radio interface configured to communicate with the UE and a communication interface configured to forward to the host computer the user data carried by a transmission from the UE to the base station.

Embodiment 102

The communication system of the previous 3 embodiments, wherein:

the processing circuitry of the host computer is configured to execute a host application; and the UE's processing circuitry is configured to execute a client application associated with the host application, thereby providing the user data.

Embodiment 103

The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

Embodiment 104

A method implemented in a communication system including a host computer, a base station and a user equipment (UE), the method comprising:

at the host computer, receiving user data transmitted to the base station from the UE, wherein the UE performs any of the steps of any of the Group A embodiments.

Embodiment 105

The method of the previous embodiment, further comprising, at the UE, providing the user data to the base station.

Embodiment 106

The method of the previous 2 embodiments, further comprising:

at the UE, executing a client application, thereby providing the user data to be transmitted; and at the host computer, executing a host application associated with the client application.

Embodiment 107

The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

Embodiment 108

A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment 109

The communication system of the previous embodiment further including the base station.

Embodiment 110

The communication system of the previous 2 embodiments, further including the UE, wherein the UE is configured to communicate with the base station.

Embodiment 111

The communication system of the previous 3 embodiments, wherein:

the processing circuitry of the host computer is configured to execute a host application;

the UE is configured to execute a client application associated with the host application, thereby providing the user data to be received by the host computer.

Embodiment 112

A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

Embodiment 113

The method of the previous embodiment, further comprising at the base station, receiving the user data from the UE.

Embodiment 114

The method of the previous 2 embodiments, further comprising at the base station, initiating a transmission of the received user data to the host computer.

Explanations are provided below for various abbreviations/acronyms used in the present disclosure.

| Abbreviation | Explanation |
|---|---|
| CU | Central Unit |
| DHCP | Dynamic Host Control Protocol |
| DU | Distributed Unit |
| IAB | Integrated Access and Backhaul |
| RRC | Radio Resource Control |
| RAN | Random Access Network |
| PDCP | Packet Data Convergence Protocol |

References are identified below.

[1] R3-193956: "Analysis on IP address management", Nokia, Nokia Shanghai Bell, RAN3#105, August 2019.

[2] R3-193979: "Further discussion on IP address issues of IAB network", Samsung, RAN3#105, August 2019.

[3] R3-193980: "[Draft] LS on IP assignment in IAB network", Samsung, RAN3#105, August 2019.

[4] R3-193985: "IP address management during the IAB migration", Samsung, RAN3#105, August 2019.

[5] R3-194332: "IP address management for IAB node", Huawei, RAN3#105, August 2019.

[6] R3-193563: "IAB parent-node change", Qualcomm Incorporated, RAN3#105, August 2019.

Figure 22:
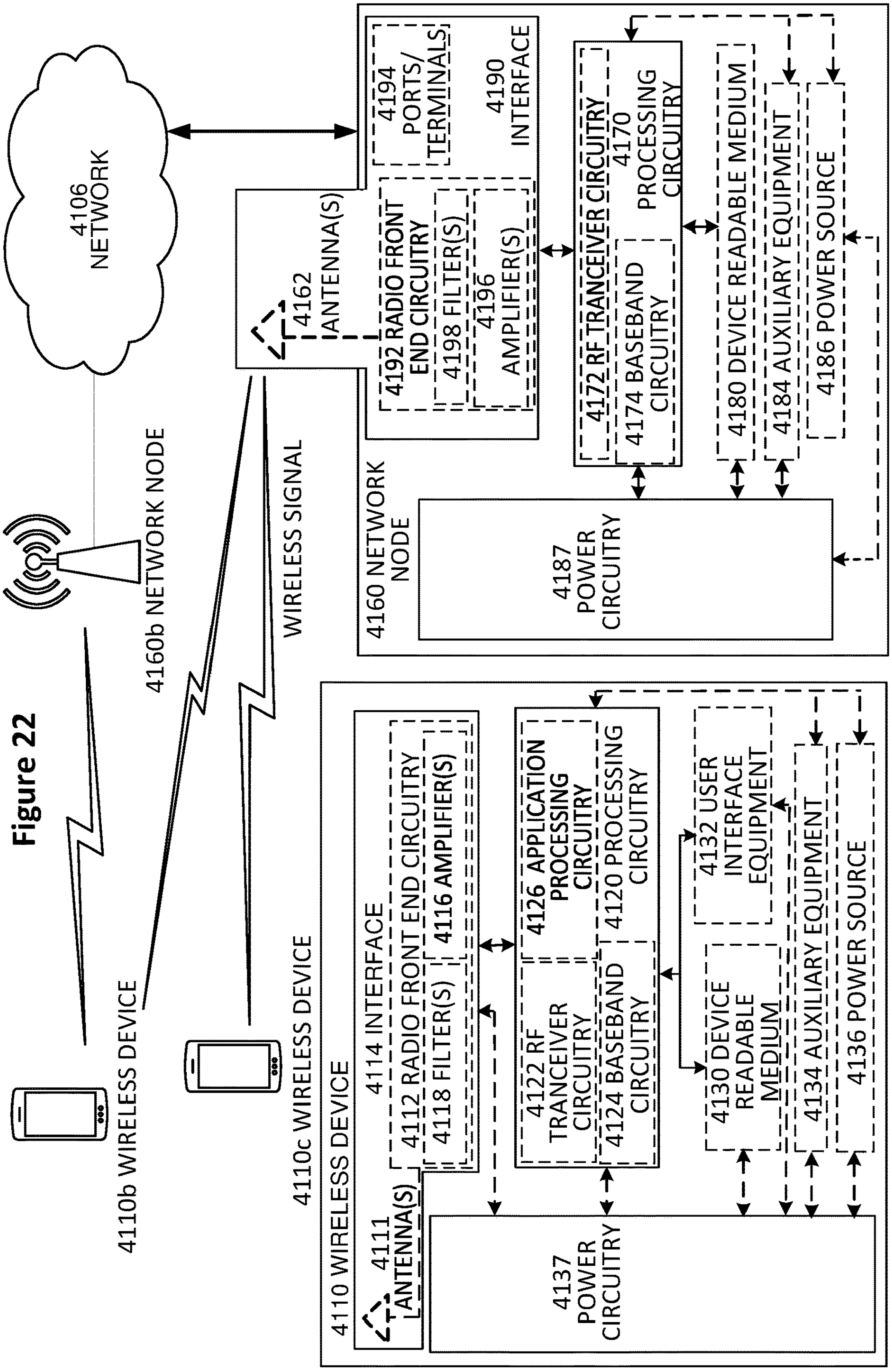
FIG. 22 is a block diagram of a wireless network in accordance with some embodiments.

FIG. 22 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network 4106, network nodes 4160 and 4160*b*, and WDs 4110,

4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units.

In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 22 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 23:
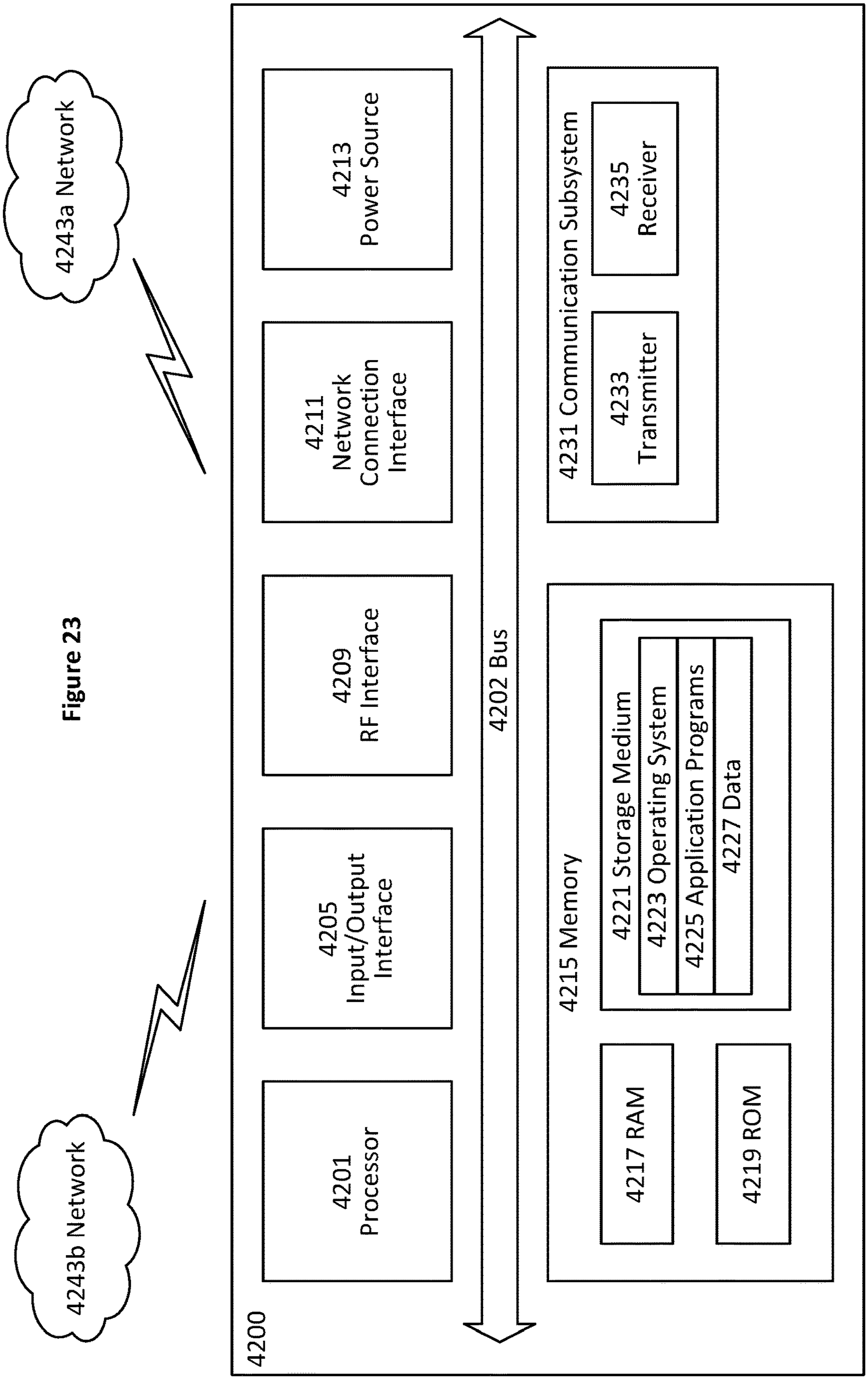
FIG. 23 is a block diagram of a virtualization environment in accordance with some embodiments.

FIG. 23 illustrates a virtualization environment in accordance with some embodiments.

FIG. 23 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 23, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 24:
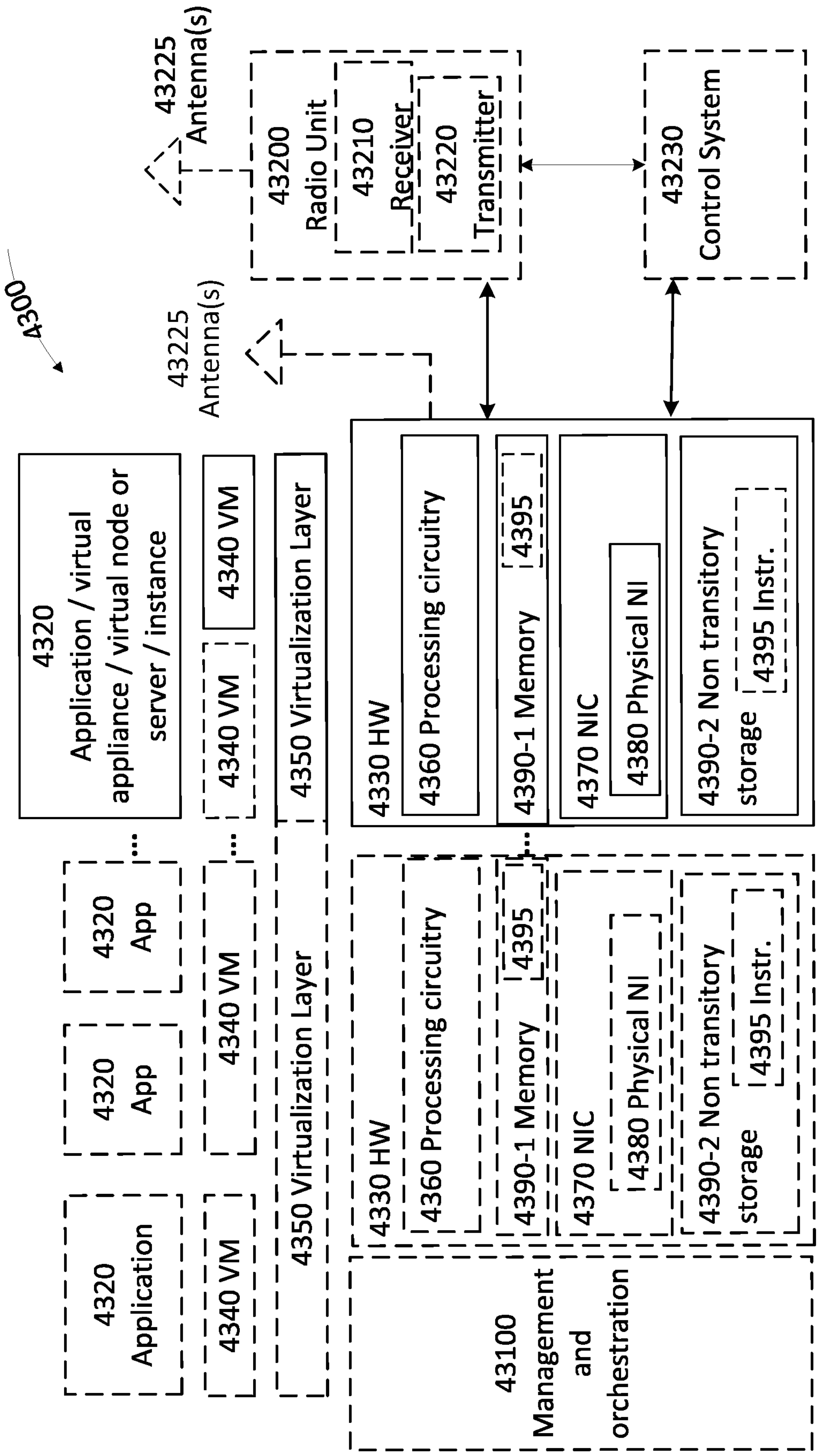
FIG. 24 is a block diagram of a telecommunication network connected via an intermediate network to a host computer in accordance with some embodiments.

FIG. 24 illustrates a telecommunication network connected via an intermediate network to a host computer in accordance with some embodiments.

With reference to FIG. 24, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 24 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 25:
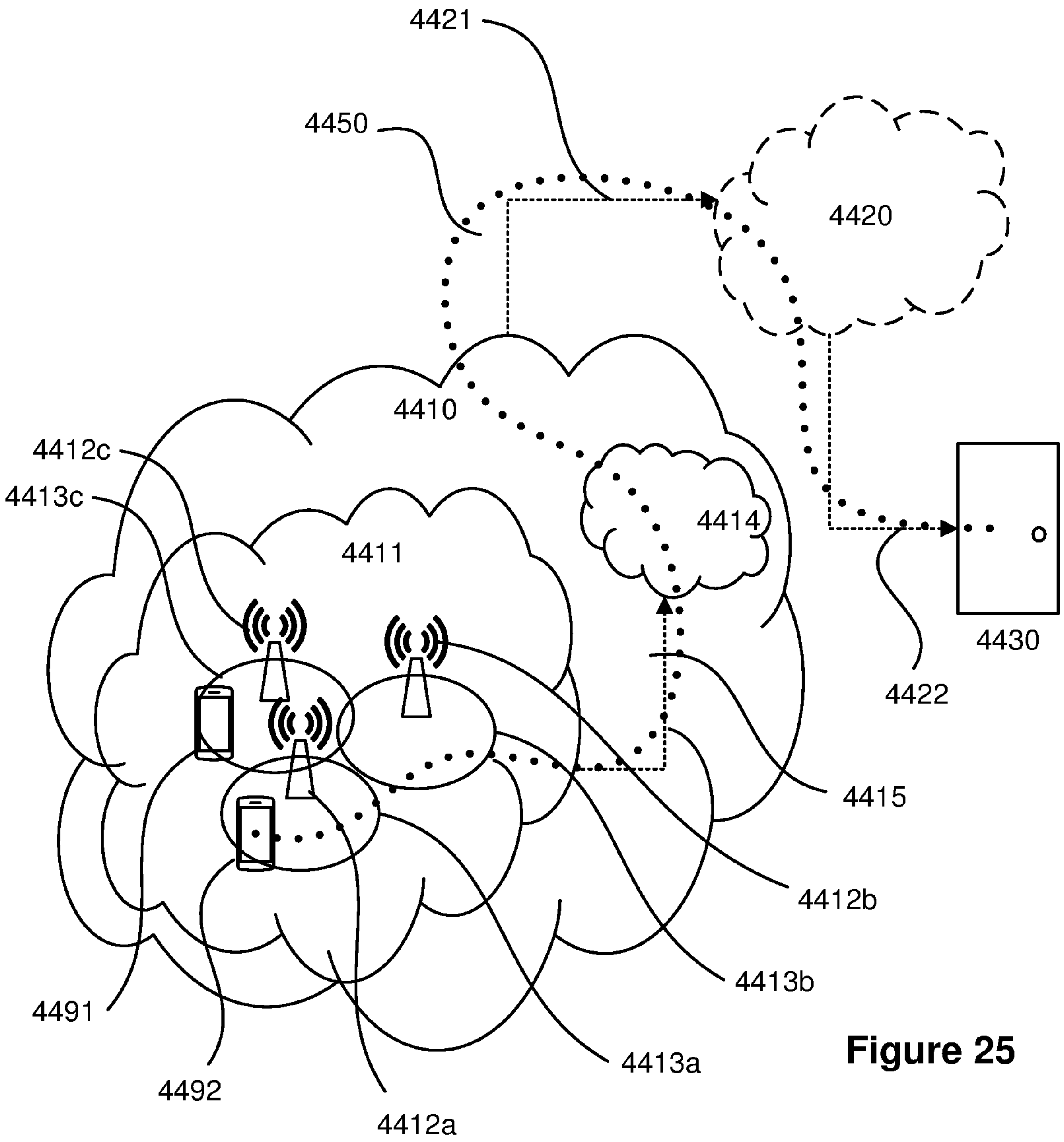
FIG. 25 is a block diagram of a host computer communicating via a base station with a user equipment over a partially wireless connection in accordance with some embodiments.

FIG. 25 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 26. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 25) served by base station 4520. Communication interface 4526 may be configured to facilitate connection 4560 to host computer 4510. Connection 4560 may be direct or it may pass through a core network (not shown in FIG. 25) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 25 may be similar or identical to host computer 4430, one of base stations 4412*a*, 4412*b*, 4412*c* and one of UEs 4491, 4492 of FIG. 24, respectively. This is to say, the inner workings of these entities may be as shown in FIG. 25 and independently, the surrounding network topology may be that of FIG. 24.

In FIG. 25, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 26:
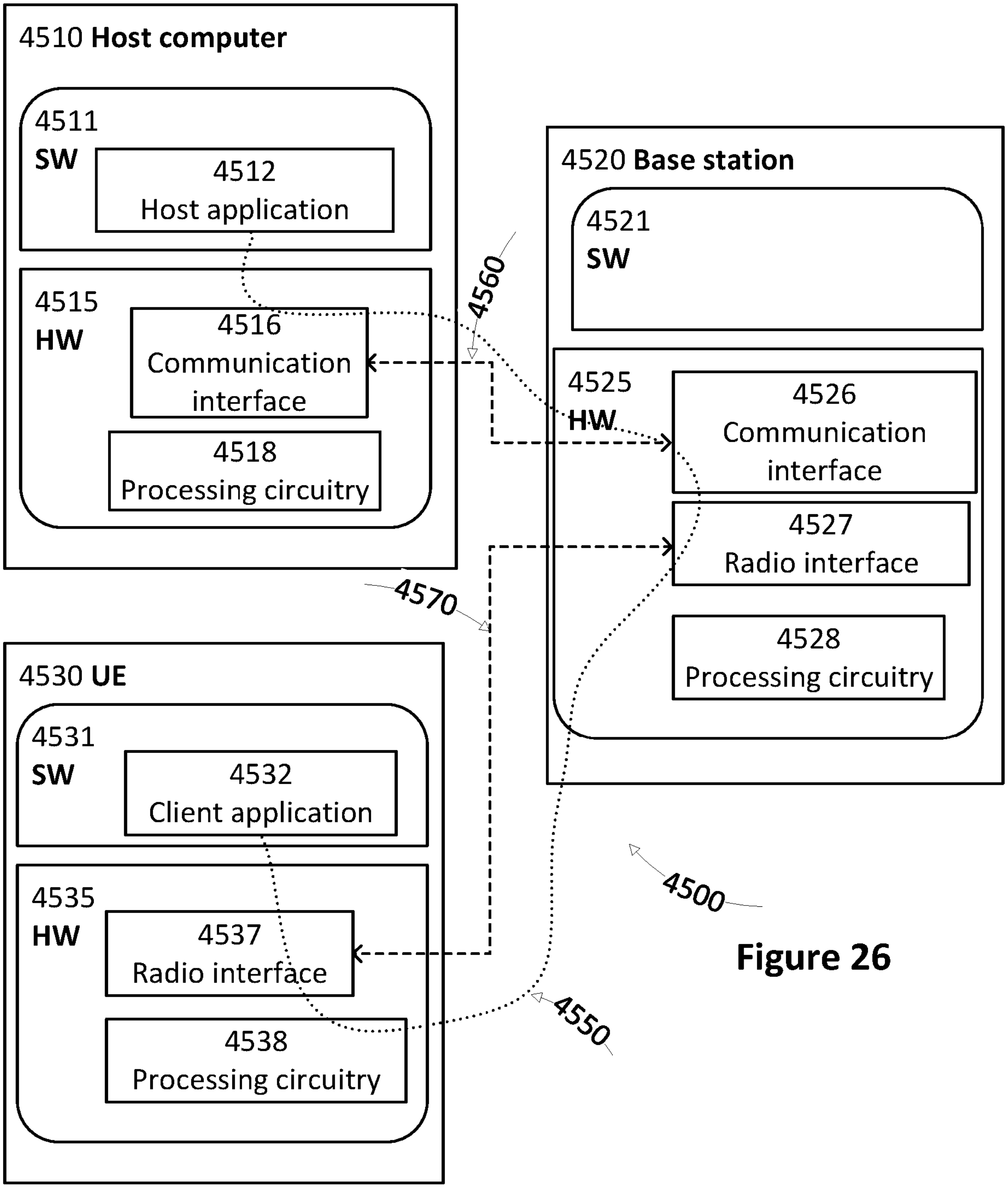
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments FIG. 26 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 26 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 27:
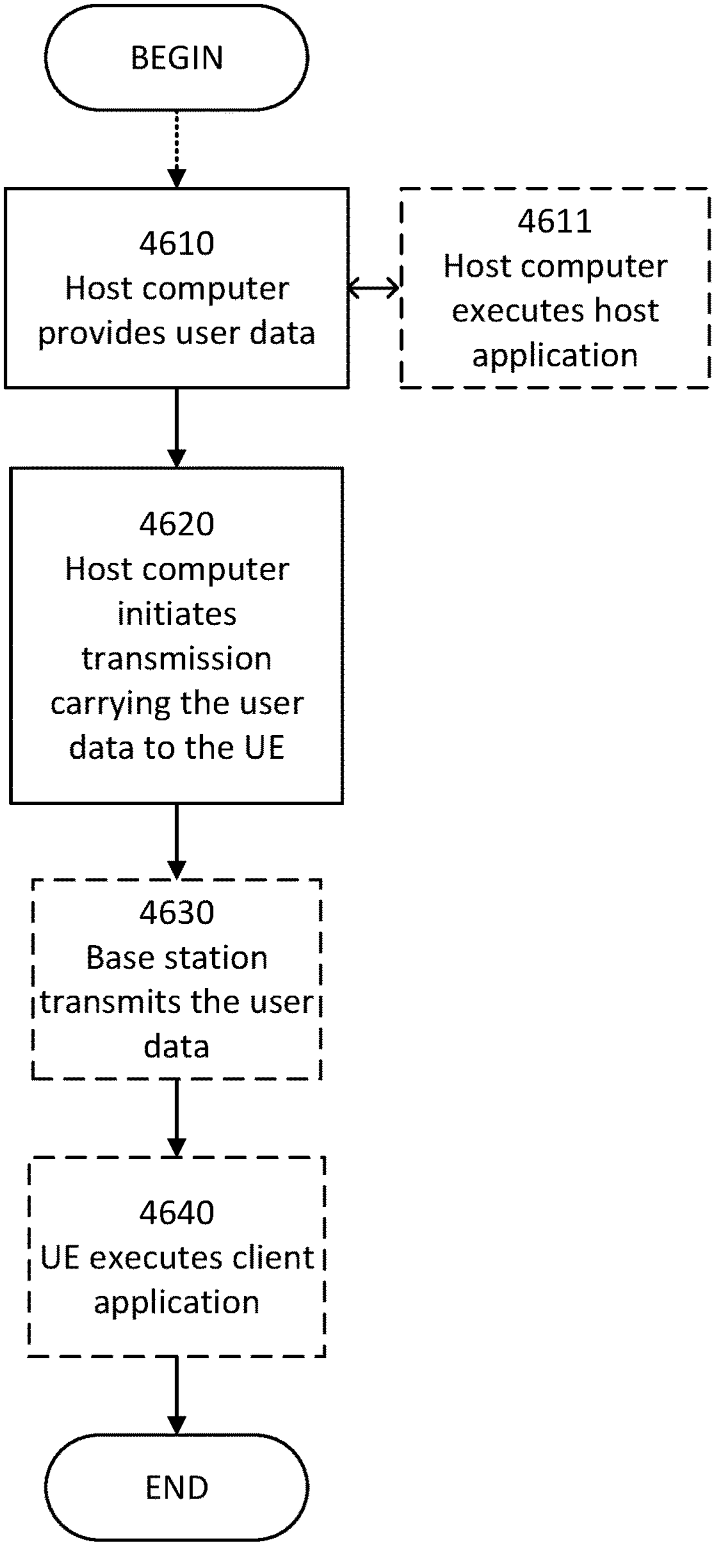
FIG. 27 is a block diagram of methods implemented in a communication system including a host computer, a base station and a user equipment in accordance with some embodiments.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 27 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 28:
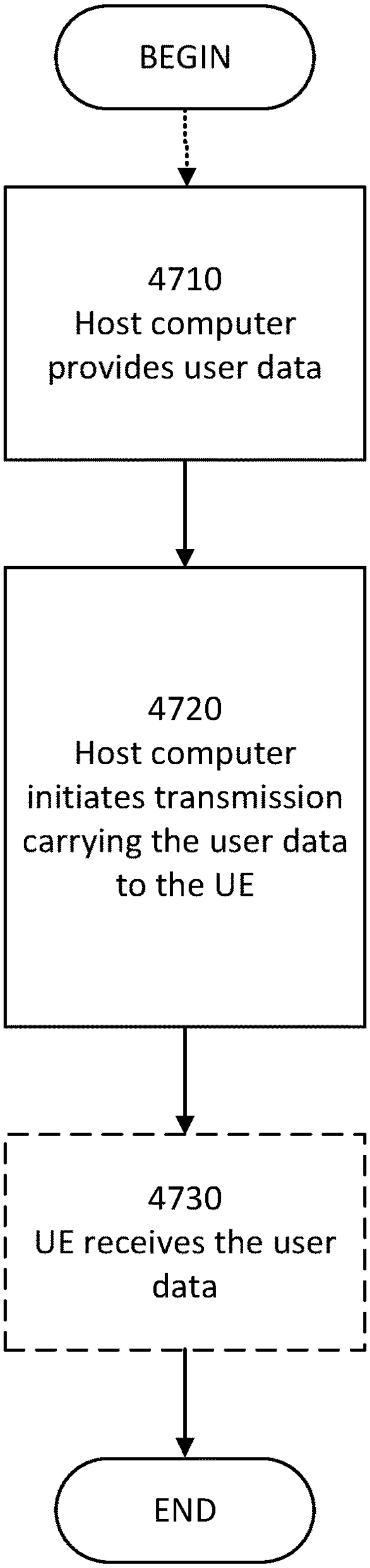
FIG. 28 is a block diagram of methods implemented in a communication system including a host computer, a base station and a user equipment in accordance with some embodiments.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 28 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 29:
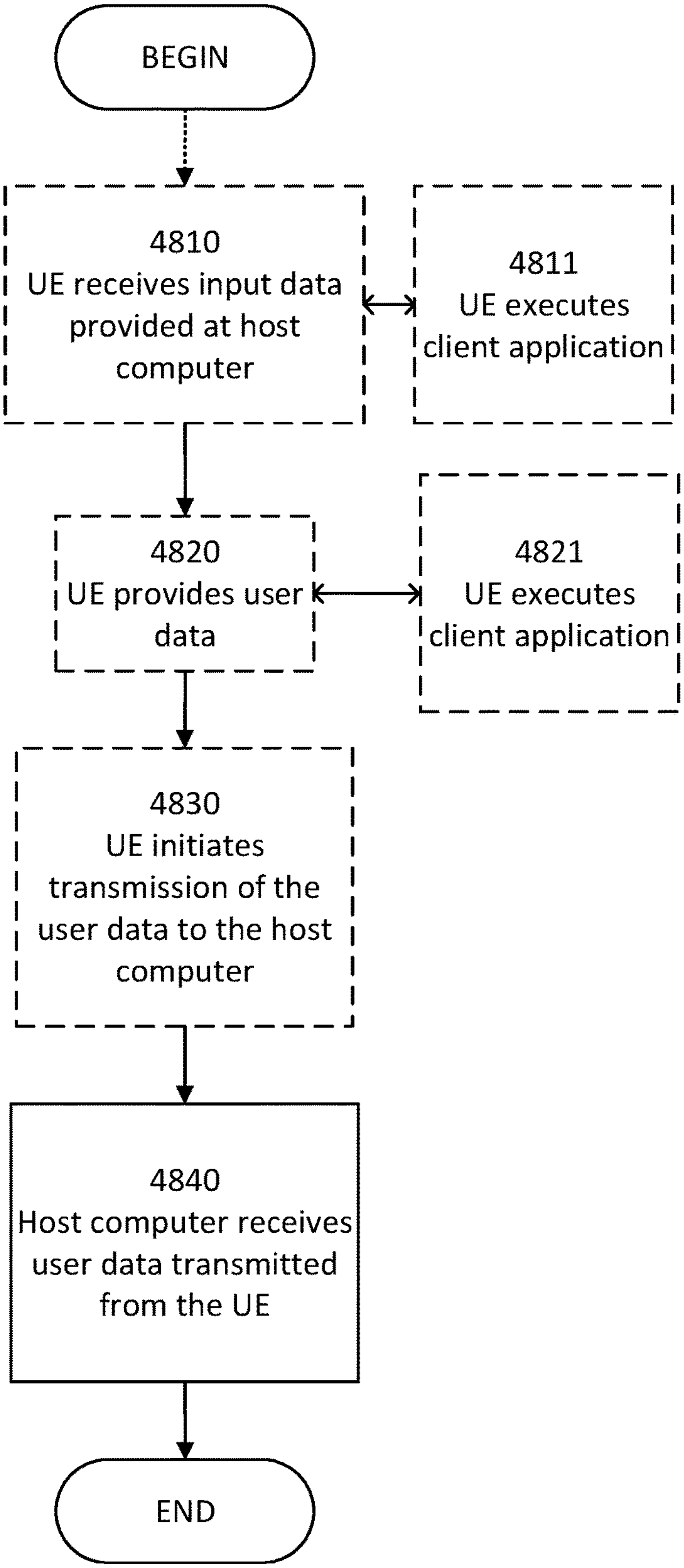
FIG. 29 is a block diagram of methods implemented in a communication system including a host computer, a base station and a user equipment in accordance with some embodiments.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 24 and 25. For simplicity of the present disclosure, only drawing references to FIG. 29 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 30:
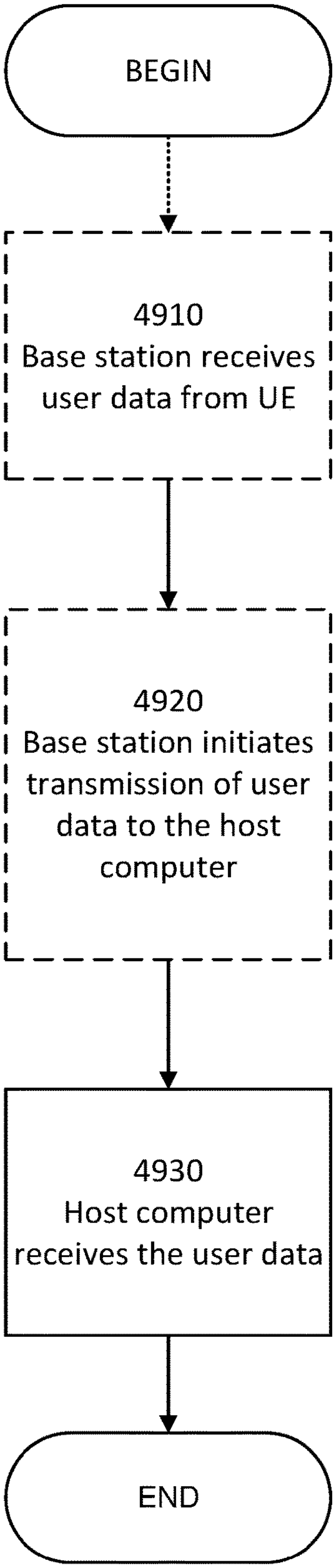
FIG. 30 is a block diagram of methods to allocate an IP address according to some embodiments of inventive concepts.
Figure 31:
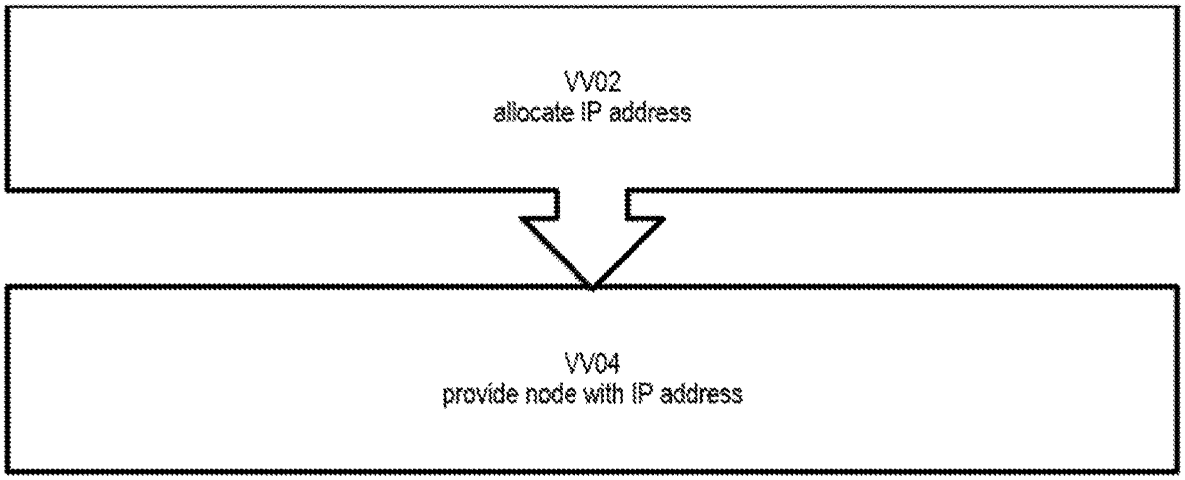

FIG. 30. Method in accordance with some embodiments.

FIG. 30 depicts a method in accordance with particular embodiments, the method begins at step VV02 with the allocation of an IP address. The IP address may be allocated by a donor DU. This may comprise any of the features, aspects, sub-steps, or benefits described in this document.

At step VV04 the IP address is provided to the node. The node may be an IAB node.

A Virtual Apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 5G | 5th Generation |
| CDMA | Code Division Multiplexing Access |
| CP | Cyclic Prefix |
| DL | Downlink |
| eNB | E-UTRAN NodeB |
| E-UTRAN | Evolved UTRAN |
| gNB | Base station in NR |
| GSM | Global System for Mobile communication |
| HO | Handover |
| LTE | Long-Term Evolution |
| MAC | Medium Access Control |
| NR | New Radio |
| OSS | Operations Support System |
| O&M | Operation and Maintenance |
| PDCP | Packet Data Convergence Protocol |
| RAN | Radio Access Network |
| RLC | Radio Link Control |
| RNC | Radio Network Controller |
| RRC | Radio Resource Control |
| SON | Self Optimized Network |
| UE | User Equipment |
| UL | Uplink |
| UTRAN | Universal Terrestrial Radio Access Network |
| WCDMA | Wide CDMA |
| WLAN | Wide Local Area Network |

The invention claimed is:

1. A method performed by a donor distributed unit, DU, node for allocating internet protocol, IP, addresses, the method comprising:

receiving a request to allocate an IP address for a wireless node;

allocating the IP address for the wireless node; and transmitting the IP address towards the wireless node wherein receiving the request comprises receiving an F1-Application Protocol, F1-AP, message from a donor central unit, CU, node that implicitly or explicitly requests allocation of the IP address for the wireless node;

wherein allocating the IP address comprises transmitting a message to the donor CU node requesting allocation of one or more IP addresses for allocating to wireless nodes;

wherein transmitting the message comprises transmitting a message that includes an integer indicating a number of IP addresses to be allocated to the wireless node, wherein the number of IP addresses is based on knowledge of on how many IP addresses the wireless node is currently allocated or knowledge of how many IP addresses the donor DU node previously allocated for the wireless node.

2. The method of claim 1 wherein allocating the IP address comprises allocating the IP address using an operations, administration, and maintenance, OAM, configuration or a dynamic host control protocol, DHCP, based method.

3. The method of claim 1 wherein allocating the IP address comprises allocating the IP address by the Donor DU node performing at least one of:

allocating the IP address by using a pre-configured IP address from a group of IP addresses the Donor DU node can allocate;

sending a dynamic host control protocol, DHCP, request to a local DHCP server or;

requesting an operations, administration, and maintenance, OAM, system for one or more IP addresses.

4. The method of claim 1 further comprising:

responsive to receiving the F1-AP message, configuring at least one of backhaul radio link control, BH RLC, channels or backhaul adaptation protocol, BAP, addresses for the wireless node.

5. The method of claim 4, further comprising associating the IP address with one or more BAP addresses of the wireless node in the Donor DU node.

6. The method of claim 5 further comprising mapping the IP address associated with the one or more BAP addresses of the wireless node to map downlink, DL, IP packets addressed to the IP address allocated to a correct BAP address within an integrated access and backhaul, IAB, network.

7. The method of claim 1, wherein transmitting the IP address towards the wireless node comprises:
 transmitting the IP address for the wireless node to the donor CU node to forward the IP address to the wireless node.

8. A donor distributed unit, DU node, comprising:
 processing circuitry; and
 memory coupled with the processing circuitry, wherein the memory includes instructions that when executed by the processing circuitry causes the donor DU node to perform operations comprising:
  receiving a request to allocate an IP address for a wireless node;
  allocating the IP address for the wireless node; and
  transmitting the IP address towards the wireless node wherein in receiving the request to allocate the IP address, the memory includes further instructions that when executed by the processing circuitry causes the donor DU node to perform further operations comprising receiving an F1-Application Protocol, F1-AP, message from a donor central unit, CU, node that implicitly or explicitly requests allocation of the IP address for the wireless node;
  transmitting a message to a donor control unit, CU, node requesting allocation of a range of IP addresses for allocating to wireless nodes;
 transmitting a message that includes an integer indicating a number of IP addresses to be allocated to the wireless node, wherein the number of IP addresses is based on knowledge of on how many IP addresses the wireless node is currently allocated or knowledge of how many IP addresses the donor DU node previously allocated for the wireless node.

* * * * *